US007233942B2

(12) United States Patent
Nye

(10) Patent No.: US 7,233,942 B2
(45) Date of Patent: Jun. 19, 2007

(54) METHOD AND APPARATUS FOR PROVIDING GEOGRAPHICALLY AUTHENTICATED ELECTRONIC DOCUMENTS

(75) Inventor: Timothy G. Nye, Guelph (CA)

(73) Assignee: TrueLocal Inc., Guelph, Ontario (CA)

( * ) Notice: Subject to any disclaimer, the term of this patent is extended or adjusted under 35 U.S.C. 154(b) by 293 days.

(21) Appl. No.: 10/620,170

(22) Filed: Jul. 15, 2003

(65) Prior Publication Data

US 2004/0064334 A1   Apr. 1, 2004

Related U.S. Application Data

(63) Continuation of application No. 09/685,226, filed on Oct. 10, 2000, now abandoned.

(51) Int. Cl.
*G06F 17/30* (2006.01)
(52) U.S. Cl. ............................. 707/3; 707/10; 707/102; 707/104.1
(58) Field of Classification Search .............. 707/1–10, 707/100–104.1
See application file for complete search history.

(56) References Cited

U.S. PATENT DOCUMENTS

| | | | |
|---|---|---|---|
| 4,974,170 A | 11/1990 | Bouve et al. | |
| 5,375,235 A | 12/1994 | Berry et al. | |
| 5,469,354 A | 11/1995 | Hatakeyama et al. | |
| 5,546,578 A | 8/1996 | Takada | |
| 5,659,617 A | 8/1997 | Fischer | |
| 5,682,525 A | 10/1997 | Bouve et al. | |
| 5,685,003 A | 11/1997 | Peltonen et al. | |
| 5,748,954 A | 5/1998 | Mauldin | |
| 5,787,295 A | 7/1998 | Nakao | |
| 5,787,421 A | 7/1998 | Nomiyama | |
| 5,799,184 A | 8/1998 | Fulton et al. | |
| 5,813,006 A * | 9/1998 | Polnerow et al. | ............. 707/10 |
| 5,832,479 A | 11/1998 | Berkowitz et al. | |
| 5,839,088 A | 11/1998 | Hancock et al. | |
| 5,845,273 A | 12/1998 | Jindal | |
| 5,845,305 A | 12/1998 | Kujiraoka | |

(Continued)

FOREIGN PATENT DOCUMENTS

WO    WO 00/27091    5/2000

OTHER PUBLICATIONS

Retrieved from the Internet <URL:http://www.hyperbee.com/>[retrieved on Dec. 11, 2001].

(Continued)

*Primary Examiner*—Isaac Woo
(74) *Attorney, Agent, or Firm*—Hamilton, Brooks, Smith & Reynolds, P.C.

(57) ABSTRACT

A method and apparatus for providing geographically authenticated electronic documents is disclosed. Authentication for attributes for an electronic document stored on a computer network are defined, the attributes comprise at least one attribute describing a geographic location associated with the electronic document. Authenticated attributes (e.g., geographic location) of electronic documents (e.g., Web pages) allow for more accurate geographic searching and filtering. An authenticated digital certificate is created and associated with an electronic document. The authenticated digital certificate can be stored within the electronic document, such as can be done with HTML tags on a Web page. The digital certificate can also be stored as a separate file associated with the electronic document, as a separate signed digital certificate and as a database record.

21 Claims, 13 Drawing Sheets

U.S. PATENT DOCUMENTS

| | | | |
|---|---|---|---|
| 5,848,409 | A | 12/1998 | Ahn |
| 5,848,410 | A | 12/1998 | Walls et al. |
| 5,852,810 | A | 12/1998 | Sotiroff et al. |
| 5,884,038 | A | 3/1999 | Kapoor |
| 5,890,172 | A | 3/1999 | Borman et al. |
| 5,930,474 | A | 7/1999 | Dunworth et al. |
| 5,944,769 | A | 8/1999 | Musk et al. |
| 5,948,061 | A | 9/1999 | Merriman et al. |
| 6,029,165 | A | 2/2000 | Gable |
| 6,070,157 | A | 5/2000 | Jacobson et al. |
| 6,094,649 | A | 7/2000 | Bowen et al. |
| 6,182,068 | B1 | 1/2001 | Culliss |
| 6,202,065 | B1 * | 3/2001 | Wills .............................. 707/5 |
| 6,295,528 | B1 * | 9/2001 | Marcus et al. .................. 707/3 |
| 6,324,645 | B1 * | 11/2001 | Andrews et al. ............ 713/157 |
| 6,324,646 | B1 | 11/2001 | Chen et al. |
| 6,434,548 | B1 | 8/2002 | Emens et al. |
| 6,665,659 | B1 | 12/2003 | Logan |
| 6,732,141 | B2 | 5/2004 | Ellis |
| 6,757,730 | B1 | 6/2004 | Lee et al. |
| 6,775,831 | B1 | 8/2004 | Carrasco et al. |
| 2001/0011270 | A1 | 8/2001 | Himmelstein et al. |
| 2001/0037332 | A1 | 11/2001 | Miller et al. |
| 2002/0038348 | A1 | 3/2002 | Malone et al. |

OTHER PUBLICATIONS

Kelsey, D., HyperBee Search Engine Follows Seti@Home Model [online], [retrieved on Dec. 11, 2001]. Retrieved from the Internet <URL:http://newsbytes.com/cgi-bin/udt/im.display.printable?client.id=newsbytes&story.id=172049>.

Retrieved from the Internet <URL:http://www.microsoft.com/streets/> [retrieved on May 23, 2002].

"Location Intelligence Solutions",Retrieved from the Internet <URL:http://www.geotouch.com/content/solutions/li_solutions. html> [retrieved on May 23, 2002].

"Google searches more sites more quickly, delivering the most relevant results", Retrieved from the Internet <URL:http://www.google.com/technology/index.html> [retrieved on May 23, 2002].

thinkstream, welcome to thinkstream technology, Retrieved from the Internet <URL:http://www.thinkstream.com/> [retrieved on Oct. 27, 2000].

looksmart help, Retrieved from the Internet <URL:http://www.looksmart.com/r?page=/help/main.html> [retrieved on Aug. 9, 2000].

Gnutella News, What is Gnutella?, Retrieved from the Internet <URL:http://www.gnutellanews.com/information/what_is_gnutella.shtml> [retrieved on Nov. 13, 2000].

Moritz, G., "SETI and Distributed Computing," Retrieved from the Internet <URL:http://www.gtexts.com/college/papers/s7.html> [retrieved on Oct. 26, 2000].

About the Open Directory Project, Retrieved from the Internet <URL:http://dmoz.org/about.html> [retrieved on Aug. 9, 2000].

Press Releases, milestones and achievements, Retrived from the Internet <URL:http://corp.oingo.com/Press_Releases/PR_Releases/DS_pr_102400.html> [retrieved on Jan. 12, 2001].

raging search, What is Raging Search?, Retrieved from the Internet <URL:http://ragingsearch.altavista.com/cgi-bin/query?pg=acc&v=about> [retrieved on Aug. 9, 2000].

NeGeo Products, Products, Retrieved from the Internet <URL:http://www.netgo.com/product.html> [retrieved on Aug. 15, 2000].

VIVÍSIMO. [online], [retrieved on Oct. 22, 2004]. Retrieved from the Internet ,URL: http://www.vivisimo.com/search?query=houseplans&v%3Asources=Web.

"Geo Tags for HTML Resource Discovery," http://geotags.com/geo/, downloaded May 25, 2000 (22 pp.).

"Enhance your business listing in Yahoo!Yellow Pages," http://yp.yahoo. com/featured, downloaded May 16, 2000 (1 p.).

"Where in the World is netgeo.caida.org?" http://www.caida.org/outreach/resources/papers.inet_netgeo;, downloaded May 18, 2000 (14 pp.).

"GeoTrust—Building Trust," http//www.geotrust.com/building_trust/. downloaded May 19, 2000 (1 page).

"GeoTrust—Magazine Have You Been Spoofed?" http://www.geotrust.com/e_mag/feature_editorial, downloaded May 19, 2000 (2 pp.).

"Authentication Service Bureau," http://www.verisign.com/products/asb/ index.html, downloaded Mar. 20, 2001 (1 p.).

"dot com directory," http://www.dotcomdirectory.com/nsi/basic. hm, downloaded May 22, 2000 (1 p.).

"GeoSearch—Localizing Web Searches," http://www.vicinity.com/vicinity/services/GeoSearch_wp.pdf, downloaded Mar. 27, 2001 (6 pp.).

"Dogpile Catalog: Search Results { }", http://catalog.dogpile.com/texis/ catalog/about.html, downloaded Jun. 20, 2000 (3 pp.).

"whereonearth.com—software demos," http://www.whereonearth.com/prod- info/geozip.htm, downloaded Jul. 6, 2000 (2 pp.).

"TraceWare™ 3.0:Geographic Intelligence for E-Business," downloaded from www.digitalisland.net/common/pdf/traceware_ds.pdf (2 pp.).

dot com directory: About the dot com directory™, http://www.dotcomdirectory.com/nsi/about.hm, downloaded May 22, 2000 (1 p.).

"Geotouch," http://www.geotouch.com/content/home.html, downloaded Jun. 19, 2000 (2 pp.).

* cited by examiner

AUTHENTICATED DIGITAL CERTIFICATE        AFDG99FF

RET classification=Retail           TRUST LEVEL: GOLD

SIC CODE: 2345 – Video Rental and Sales

URL: www.Business_A/video/homepage.html  >click here for details<

Parent URL: www.Business_A.com

Latitude: 123.23W  Longitude: 54.56N  Altitude (mean sea level): 1250'

Number of locations: 15           >click here for all locations<

Main Address:  123 anywhere street        Main phone: 519-555-5555
                   Somewhere USA              Main fax:   519-555-6666
                   12345-6789

>Click HERE for map<        -or-        >Click HERE for directions<

WEB                                 BUSINESS
Language = English                  Language = English, Spanish

Privacy =  CK=YES, EDS=NO           Hrs of Operation   Mon   9-5
               IDS=YES, POS=YES                                Tues  9-5
WAP = NO                                                   Wed   9-5
                                                               Thurs 9-5
Email address: >click here<                                    Fri   9-9
                                                               Sat   10-5
                                                               Sun   CLOSED
                                        Handicapped Accessible:  YES

Terms: Visa, MC, Amex               Terms: Visa, MC, Amex, cash, check

RETURN POLICY:
14 days if unopened. 15% restocking     Full refund at store at current price. No
fee                                     restocking fee >Click HERE for EXTENDED PROFILE<

MEMBERSHIPS / ASSOCIATIONS

FIG. 3

AUTHENTICATED DIGITAL CERTIFICATE            AFDG99FD

WEB Classification=Virtual            TRUST LEVEL: GREEN

SIC CODE: 5678 – online store

URL: www.Business_C.com/index.html    >click here for details<

Parent URL: www.Business_C.com

Latitude: 123.23W   Longitude: 54.56N   Altitude (mean sea level): 1250'

| | | |
|---|---|---|
| Server Address: | ISP Services, Inc. | Main phone: 519-555-5555 |
| | 123 Anywhere Street | Main fax:    519-555-6666 |
| | Somewhere, USA | |
| >click here for MAP< | 12345-6789 | |

WEB                              ZONES OF SERVICE

Language = English          Books       Global
                                Electronics USA
Privacy =   CK=YES, EDS=NO   Financial Services   USA
              IDS=YES, POS=YES                        (less VT,CA,MN,NY)
                                Alcohol      California Only
WAP = NO                     Guns        Texas Only

Email address: >click here<      >click here for ZONE MAPS<

Terms: Visa, MC, Amex

RETURN POLICY:
14 days if unopened. 15% restocking fee

>Click HERE for EXTENDED PROFILE<

MEMBERSHIPS / ASSOCIATIONS

  

FIG. 4

Authenticated Digital Certificate - Extended

CATEGORY: VIDEO SALES AND RENTAL     Certificate ID:    AFDG99FD

Number of stores in chain: 15

Square footage: 2600

Number of video titles: 3500

<u>Category of videos available</u>
New releases = YES
Adult – Soft   = NO
Adult – XXX   = NO
Children = YES
Foreign Films = YES
Classics = YES Media Source:      VHS = YES    DVD = YES    Beta = NO Rental machines:     VHS = YES    DVD = NO    Beta = NO Deposit required with machine rental: YES       Amount: $500

Membership required: YES (available onsite with ID)

RENTAL PERIODS

New Releases: next day by 11:00 pm      Tape Insurance: Yes, Optional
                                                                               Amount: $0.50
Others: second day by 11:00 pm Children: seventh day by 11:00 pm

Products for Sale
Videos = YES           Snacks = YES           Drinks = YES

BUSINESS DESCRIPTION
Videostore is Southern Ontario's leading provider of DVD and video rentals. We always guarantee the availability of select new releases, and every store has free popcorn while you browse. Visit our website for free coupons and the latest promotions.

KEYWORDS
Video, DVD, rent, popcorn, guaranteed availability.

FIG. 5

METHOD AND APPARATUS FOR PROVIDING GEOGRAPHICALLY AUTHENTICATED ELECTRONIC DOCUMENTS

RELATED APPLICATIONS

This application is a continuation of U.S. application Ser. No. 09/685,226, filed Oct. 10, 2000 now abandoned, the entire teachings of which are incorporated herein by reference.

BACKGROUND OF THE INVENTION

This invention relates generally to enhanced searching techniques for electronic documents, and more specifically to the authenticating of electronic documents, referenced by electronic document addresses associated with geographic locations used in searching.

Searching for a particular electronic document on a network based upon geographic location currently presents many problems. For example, searching to find an HTML document on the World Wide Web associated with a geographic location returns many false positives (electronic documents not really associated with the geographic location specified) while also resulting in many misses (electronic documents not found that really are associated with the geographic location). The enormous number of electronic documents on the World Wide Web (it is estimated that 2.2 million Web sites offer 300 million Web documents) multiplies the problem of false positives in a geographic based search.

Keyword-based geographic searching functionality, such as GeoSearch by Vicinity Corporation (used on www.northernlight.com) provides some geographic restricted search capability. In these systems a keyword search based upon the geographic location specified is executed, then the user's location is determined and found electronic documents that are determined to be within a predefined range of the user are reported. The user's location is usually determined by querying the user for their city, state, country or zip code information. The geographic location of the electronic documents is determined by a specialized keyword parsing algorithm designed to identify addresses within electronic documents. Simply finding keywords that indicate an electronic document contains an address does not guarantee that the address corresponds to a geographic location associated with the electronic document. For example, when searching for a list of electronic documents related to "stores selling books in Boston, Mass." many false positives are possible, including electronic documents listing "books I read while in Boston, Mass.". Additionally, stores that do not format their addresses in such a way as to be recognized by the geographic keyword searching algorithm, or exclude their address completely, will not be reported. On the World Wide Web these electronic documents are referenced by electronic document addresses in the form of a Uniform Resource Locator ("URL").

Another approach to searching for electronic documents associated with geographic locations is the use of "online yellow pages" type functionality. In these systems a directory of business names is created that is searchable and sortable using geographic location. Providers of online yellow pages directories solicit data from prospective businesses and provide a searchable online listing for the businesses. Typically, the listing includes a name, address and phone number and is searchable by business name or business category. Yellow page directories typically exclude non-business entities (e.g., schools, government offices). Some services provide a URL if the business has a Web site. An exemplary online yellow pages site is www.yellowpages.com.

Yet another approach is the creation of "localized" portals (e.g., www.ca.yahoo.com for Yahoo! Canada) and "city pages" (e.g., www.citysearch.com) which restrict their content to that associated with a specific, predetermined, geographic area. These portals allow users to restrict searches to a preselected geographic region (e.g., Canada), but the regions tend to be countries or large, well populated, cities. These localized portals and city pages are typically built by human operators indexing Web pages associated with the specific, predefined geographic location.

SUMMARY OF THE INVENTION

An opportunity exists to provide a solution to the inadequacy of current search functions for electronic documents on the World Wide Web when restrictions are desired to be limited to, or confined within a geographic region. Search engines lack the ability to search by geography and existing keyword-based geographic searching functionality suffers from a lack of accuracy and authentication of the geographic locations coded into the electronic documents, as well as a lack of proper association of geographic location with electronic documents that may contain geographic location. Additionally, the present invention does not require that the geographic location information be stored within the electronic document, nor that an electronic document have a physical location associated with it. Attributes of electronic documents can be derived from information stored within the electronic document or attributes can be created from other sources with knowledge about the electronic document or its owners.

The present invention provides for the creation of a digital certificate defined as a structured collection of data requiring only a name, an electronic address and a geographic location which are authenticated to create an authenticated digital certificate. Embodiments of the present invention can represent the authenticated digital certificate as a metatag, a separate file and a record in a database. For a traditional business its geographic location is its physical location or street address. For a virtual business that has no physical location its geographic location may be its URL, the physical location of its hosting server, the address of the owner as listed on its articles of incorporation, its corporate headquarters, or another identifier. The name and the URL may also be the same.

Current lack of authentication allows others to "spoof" legitimate business addresses, either intentionally or unintentionally, and possibly influence search results of geographically restricted searches. Lack of proper association can cause the problem of false positives to be reported in a geographically restricted search. False positives occur when a search reveals an address within an electronic document, but the electronic document is not actually associated with that address. Keyword-based geographic searching often reports a listing of electronic documents that is too wide, such that important or relevant information is hard to find within the report. For example, a Web search containing "Bermuda shorts" may return electronic documents for "Bermuda beaches" as well as "Bermuda shorts". This results in a poorly trusted environment. Trust is a critical component in enabling consumer confidence to use the Internet. The present invention provides an environment of trust of geographic locations or electronic addresses.

Yellow page directories represent a link between the physical world and the telephone. The minimum definition to be listed in the yellow pages (or the white pages) is a telephone number, and a name. Quite commonly an address is also listed, although it is not a requirement. The world represented by the paper-based yellow pages is a paid listing service, so a set of yellow pages does not represent the entire community of businesses, but only those who choose to pay for a listing. If the listings were free and every business subscribed, the yellow pages would represent a very good collection of local businesses and their phone numbers, sorted by category. The Internet equivalent of the yellow pages is simply an electronic version of the paper-based yellow pages that is available and can be viewed online. The Internet has added the ability to add maps and directions to a business listing, but the underlying concept is the same. Yellow pages are a representation of the physical world and their phone numbers, they make no provision for businesses or entities that are solely Internet based virtual businesses, businesses which do not have phones, businesses which have unlisted phone numbers, or non-business entities.

Online yellow pages directory systems are limited to businesses that have a phone number. These directory systems often require listees to pay to input their data, and often their data does not include a URL. The present invention requires the existence of a URL, even if it must be generated in order to create an authenticated digital certificate. There are many Web sites that provide yellow pages functionality. Businesses that want to be listed must choose among an array of yellow page opportunities in an attempt to get the greatest coverage for the lowest cost. Coverage can vary based upon the popularity of the Web site. For example, a yellow pages directory on a "hot" Web site may receive a million queries a day, whereas the same yellow pages directory on a non-popular site may not be queried at all. A business servicing a large geographical area may not be listed in areas where there are potential customers, due to the cost of these additional listings. The number of potential customers decreases the further out from a central location, but the yellow page costs are fixed on a per capita basis. Therefore, yellow pages are an expensive way to reach a large market area. Also, since some customers have different preferences for how far away they want to shop, there will be potential customers who will not find the business they desire since they are in a region where the business choose not to list due to economic reasons. The combination of incomplete business listings for consumers and limited coverage for businesses, in addition to a lack of accurate URLs, make current yellow page directory systems too narrow to be effective geographic searching mechanisms.

Additionally, online current yellow page systems lack a common format so that data interchange and data presentation within these systems suffer. Online yellow pages and city pages portals have no harmonious interface, some require keywords, others search by zip code, still others by SIC code. In the case of city pages, the domains are different from city to city, so there is no way to know the URL of the city page if you are visiting another city without asking someone or using a search engine. Without a method that a user can be comfortable with to find any local business on a consistent basis, the process of searching and viewing is harder to accomplish.

In contrast, a database can be created that maps the electronic world and their physical or virtual locations. In this case, the minimum definition is that the listing must have a URL (therefore some existence in the electronic world), and a name associated with that URL and a geographic location, but the geographic location need not be a physical location. Although the majority of virtual businesses have a physical headquarters where staff and machines that support the virtual business reside, it is possible to have a virtual store that is hosted by another hosting service. The virtual store may have no full time employees, no phone number and no physical location. A virtual business exists and is listed with no physical location. This type of business does not exist in the yellow pages environment.

Currently, there is an overlap between the online yellow page environment, and the electronic world. About 10% of online yellow page listings have URL addresses listed, and possibly as high as an additional 30% have URL addresses that are not displayed by the online yellow pages. In the electronic world a majority of URLs have a permanent identifiable place of business on the ground. Over time, as more and more businesses have URLs, the two worlds will start to overlap more and more, but neither will ever be a subset of the other. There will always be businesses that are not in the electronic world in any way, and there will always be virtual businesses that have no physical location. For a consumer who has a phone but no Internet connection, the paper-based yellow page database is of value and the electronic database has no value. Likewise, for someone who is online and wants to lookup URLs, the online yellow pages has limited value, and the paper-based yellow pages has no value.

There are several other important differences that exist between the online yellow page directories and a directory of geographically authenticated digital certificates. For example, because an online yellow pages directory does not require URLs it cannot sort or present its data by any characteristics that are URL dependent, such as privacy statements, recommended bandwidth or display resolution of the site, frames or no frames, terms of payment on line, language of web site, et cetera., without excluding valued listings.

Localized portals suffer from many of the same problems as keyword-based geographic searching as they often operate simply using a predefined geographic term in a standard keyword-based geographic search, and also do not require URLs.

Current solutions to the problem of geographically based search functions for electronic documents on the World Wide Web present significant problems (as discussed above). Thus, an effective technique for geographically based searching is required. Accordingly, the present invention provides a method of authentication for attributes of an electronic document stored on a computer network by identifying the attributes of the electronic document, comprising at least one attribute describing a geographic location associated with the electronic document. At least some of the attributes of the electronic document are then authenticated and an authenticated digital certificate describing the authenticated attributes of the electronic document is created and stored. The attributes can include a checksum to ensure integrity, encoding to provide space saving and accuracy, and encryption for security.

The present invention authenticates attributes (e.g., geographic location) of an electronic document (e.g., Web page) allowing for more accurate geographic searching and filtering. An authenticated digital certificate is created and associated with an electronic document. Authentication with respect to an electronic document stored on a computer network is accomplished by identifying an electronic address associated with the electronic document and identifying a geographic location associated with the electronic document. The geographic location is authenticated and an authenticated digital certificate comprising the authenticated geographic location is stored in an authenticated digital certificate database.

Authenticated digital certificates can improve searching for electronic documents on a computer network by providing a geographic location filter to a query interface and searching for electronic documents within an authenticated digital certificate database that match the geographic location. An authenticated set of electronic documents or electronic document addresses is returned.

Another improvement related to searching for electronic documents on a computer network includes parsing a keyword query and determining that a geographic search is indicated based upon the identification of geographic terms in the keyword query. A keyword search is performed on an index of the electronic documents and a geographic search, with or without keywords, is performed on records in an authenticated digital certificate database. The geographic search can be used to tag or remove results from the keyword search, or the results of both searches can be displayed in separate windows.

An authenticated digital certificate associated with an electronic document can be displayed on a computer by presenting, in a structured format, an electronic address associated with the authenticated digital certificate and displaying a representation of the authenticated digital certificate based upon selection of the electronic address.

The integrity of a stored authenticated digital certificate can be verified by obtaining an electronic document address from the stored authenticated digital certificate and establishing the existence of an electronic document associated with the electronic document address and possibly the existence of other authenticated attributes.

An example of how the present invention differs from the prior art can be illustrated by describing a typical Web page for a local travel agency (e.g., located in Boston). The travel agency's Web page may contain sections advertising five different vacation spots (e.g., Hawaii, Aruba, Las Vegas, Bermuda and Guelph). Within each section, locations of various hotels, museums and restaurants may be listed. A traditional search engine (e.g., Yahoo!) or a current geographic search engine (e.g., GeoSearch by NorthernLight) will identify the local travel agency's Web page as being associated with many addresses in Hawaii, Aruba, Las Vegas, Bermuda and Guelph, as well as Boston. This will produce many false positives in a search for local travel agencies. In contrast, an authenticated digital certificate created according to an embodiment of the present invention will associate the local travel agency's Web page with its Boston street address. Using the authenticated digital certificate a Web searcher ill be able to locate a business location more effectively and with much greater accuracy and confidence in the search results.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates an authenticated digital certificate showing basic attributes in a Retail Business classification as configured in an embodiment of the present invention.

FIG. 4 illustrates an authenticated digital certificate showing basic attributes in a Virtual classification as configured in an embodiment of the present invention.

FIG. 5 illustrates an authenticated digital certificate showing extended attributes as configured in an embodiment of the present invention.

DETAILED DESCRIPTION OF THE INVENTION

A description of preferred embodiments of the invention follows.

Figure 1:
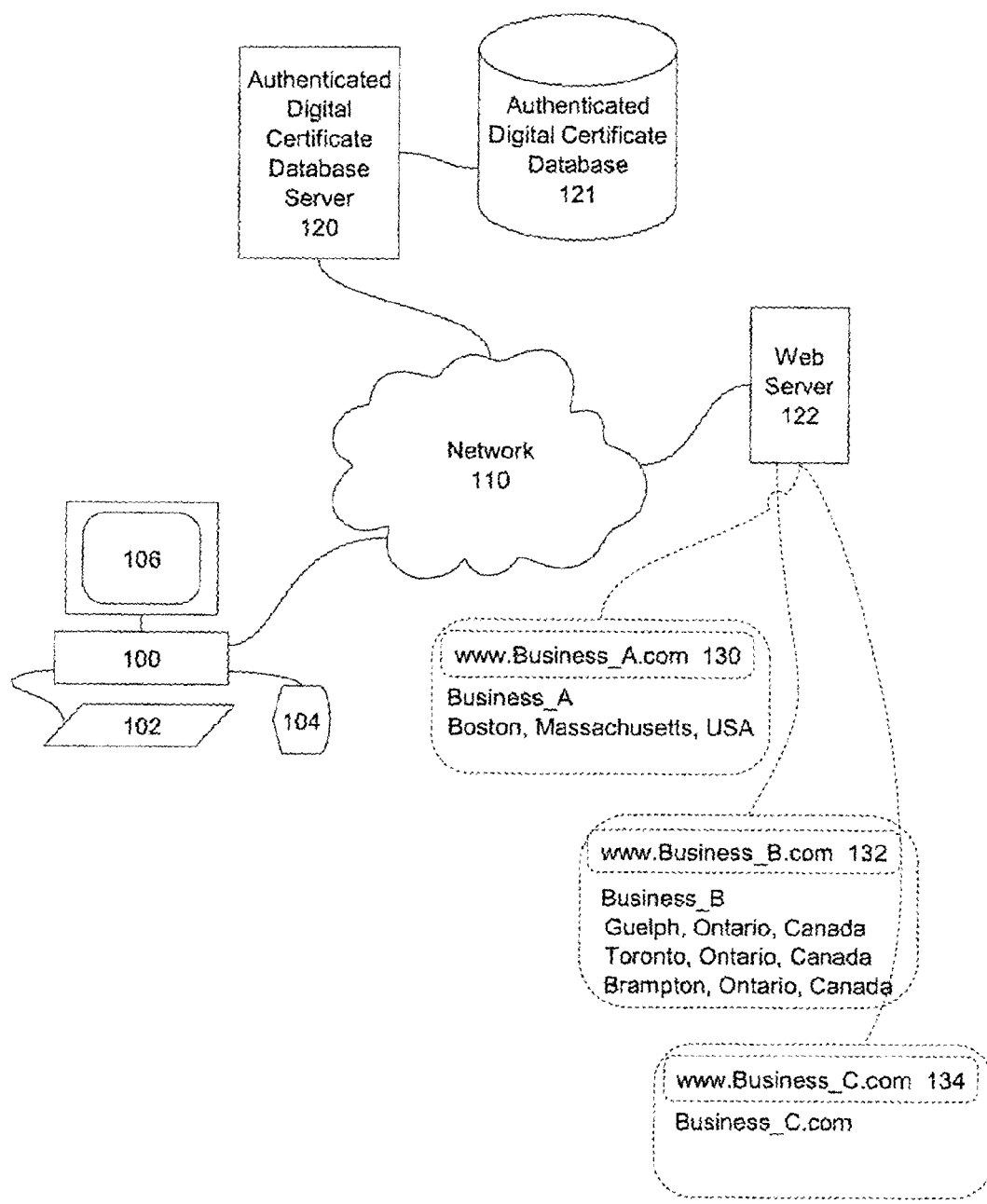
FIG. 1 illustrates a computer system on which an embodiment of the present invention is implemented.

FIG. 1 illustrates a computer system on which an embodiment of the present invention is implemented. A computer 100 provides processing and input/output devices for searching and viewing geographically authenticated electronic documents. In one embodiment of the present invention an authenticated digital certificate aware browser, running on computer 100 is used to provide searching and viewing capabilities for geographically authenticated electronic documents. Computer 100 is connected to a keyboard 102 and mouse 104 for receiving input and a display 106 for presentation of geographically authenticated electronic documents. Keyboard 102 and mouse 104 are optional examples of input devices, specific computers 100 may have unique or custom input devices (e.g., trackball or touchpad controls). Computer 100 is also linked to a network 110 having access to servers (120, 122). The network can be part of the Internet, the worldwide collection of computers, networks and gateways that use the TCP/IP suite of protocols to communicate with one another. The Internet provides a backbone of high-speed data communication lines between major nodes or host computers, consisting of thousands of commercial, government, educational, and other computer systems, that route data and messages. Web Server 122 is connected to the network 110 hosts electronic documents for display on computer 100.

The electronic documents can include specially formatted HTML Web pages as well as other electronic document types hosted on a Web server 122 or other servers connected to the network 110. As can be seen in FIG. 1, Web server 122 hosts electronic documents associated with a plurality of business entities, each having an electronic document address in the form of a Uniform Resource Locator ("URL"). In this particular example, Web server 122 hosts electronic documents associated three business entities, namely Business A, Business B and Business C. The electronic documents associated with these business entities are referenced by the electronic document addresses www.BusinessA.com 130, www.BusinessB.com 132, and www.BusinessC.com 134. The electronic document referenced by electronic document address www.BusinessA.com 130 is associated with a business having a single physical street address in Boston, Mass., USA. The electronic document referenced by electronic document address www.BusinessB.com is associated with a business having multiple physical street addresses, including: Guelph, Ontario, Canada; Toronto, Ontario, Canada; and Brampton, Ontario, Canada. The electronic document referenced by electronic document address www.BusinessC.com 130 is associated with a virtual business having no physical street address for doing business. All the electronic documents in this example are hosted on the same Web server, Web server 122, which is physically located at a site independent of the business locations associated with the electronic documents it hosts. Although, for virtual businesses Web server 122 may be listed as the geographic location of www.BusinessC.com 130.

Business entities can be organized into various classifications. A retail classification is an example of a business having a physical location. A virtual classification is an example of a business having no physical location (e.g., an online store). A hybrid business, presenting a virtual storefront on the Web for doing business and maintaining a physical street address for back-office operations, corporate headquarters or warehousing can also be represented using authenticated digital certificates having extended attributes for these "non-business" addresses.

The authenticated digital certificate is stored as a record in an online authenticated digital certificate database. Attributes of the electronic document can correspond to fields in the database record. Access and security of the authenticated digital certificate can be managed by the database management system managing the database record. The database storage configuration allows for creating authenticated digital certificates without impacting the storage or management of the electronic document itself.

An authenticated digital certificate database 121 is used to store database records representing authenticated digital certificates (see FIGS. 3, 4, 5). The authenticated digital certificate database 121 is hosted on authenticated digital certificate database server 120.

The authenticated digital certificates provide information about electronic documents hosted on various computers (e.g., Web server 122) on network 110. Authenticated digital certificate database server 120 also hosts processing routines to create, authenticate, search and verify authenticated digital certificates.

Computer 100 hosts processing routines to initiate searching and viewing of authenticated digital certificates, for example through the use of a Web browser plug-in. These processing routines can run in memory 200 (FIG. 2) as part of computer 100 or server 120. A browser is a client application that enables a user to view HTML documents on the World Wide Web, another network, or the user's computer; follow the hyperlinks among them; and transfer files. Some Web browsers require helper applications or plug-ins to accomplish one or more of these tasks. A plug-in is a small software program (e.g., authenticated digital certificate searching routine) that plugs into a larger application (e.g., Web browser) to provide added functionality (e.g., improved geographic searching).

Figure 2:
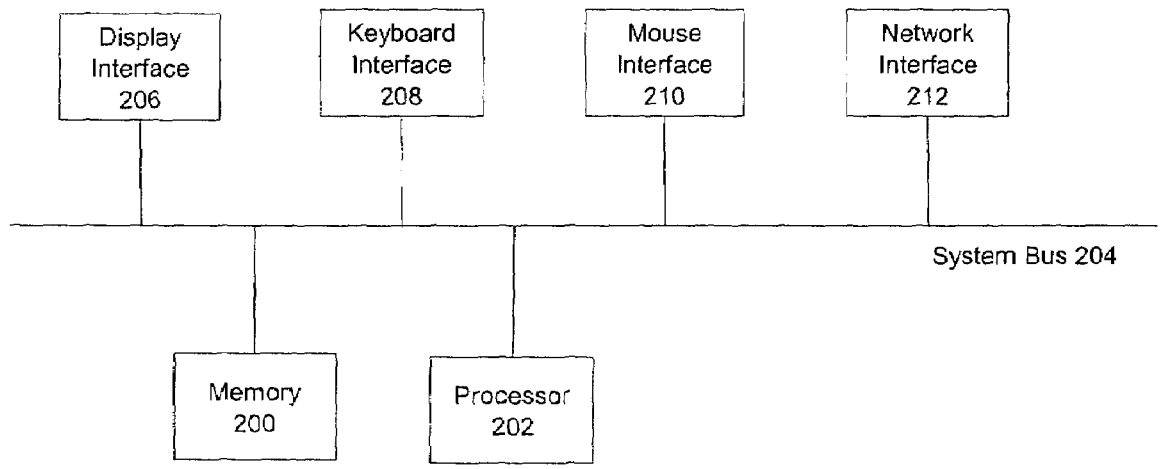
FIG. 2 shows the internal structure of a computer in FIG. 1.

FIG. 2 shows the internal structure of the computers in FIG. 1. The computers (100, 120, 122) contains a system bus 204, a bus is a set of hardware lines used for data transfer among the components of a computer system. A bus is essentially a shared highway that connects different parts of the system (e.g., processor, disk-drive controller, memory, and input/output ports) which enables the different parts to transfer information. Attached to system bus 204 is display interface 206, display interface 206 allows display 106 to communicate with other components on system bus 204. Keyboard interface 208 and mouse interface 210 are also attached to system bus 204 and allows the input devices to communicate with other components on system bus 204. Network interface 212 provides the link to an external network (e.g., network 110) allowing processes running on computer 100 to communicate with servers (e.g., 120, 122) connected to a network 110. A memory 200 can store computer software instructions and data structures used to implement embodiments of the present invention. A processor 202 executes instructions stored in memory 200, allowing the computer (100, 120) to create, authenticate, search, view and verify geographically authenticated electronic documents.

In a preferred embodiment of the present invention an electronic document address (e.g., URL) is associated with a business in one of two ways: as a physical location or as a virtual location. Note that the term business also applies to non-business entities such as government buildings, tourist attractions, schools, museums, personal Web pages, etc. The first category are businesses (or other entities) with physical retail locations defined as a place of business where a consumer can visit to view, acquire, discuss, negotiate etc. in the normal course of business or operation. This category is called 'physical'. The second category are businesses (or other entities) that do not have physical locations except possibly to support their non-physical (virtual) presence such as a website store. They may have physical locations such as a corporate headquarters, or warehouses, or home office, but there are not open to the public in the normal course of business or operation. These are defined as 'virtual' or 'Web' businesses. Hybrid combinations are also possible.

FIG. 3 illustrates an authenticated digital certificate showing basic attributes in Retail Business classification as configured in an embodiment of the present invention. A retail classification is an example of a business having a physical location. An authenticated digital certificate containing geographic location data is very important in identifying a business associated with an electronic document. Geographic location information includes street, town, country and zip code information as well as longitude, latitude and altitude information. This geographic location information can be used when searching for business within a certain proximity from a given location. The authenticated digital certificate can also be used when viewing an electronic document associated with a business to ensure the viewer is seeing verified geographic location information. Geographically verified URLs provide a level of reliability when searching and viewing electronic documents that is not provided by current geographic based searches. Businesses having a physical location have two sub-categories: businesses/entities with only one physical location and businesses/entities with more than one physical location. In the physical category the physical location is the street address of the location of a business that the consumer can visit. In the case of commercial businesses, this would likely be the address where commerce takes place, a retail outlet.

Basic attributes of an authenticated digital certificate include a certificate ID (identifier) which uniquely identifies the authenticated digital certificate. Various phone numbers associated with the business are listed. The date the authenticated digital certificate was originally created, as well as an indication of who brought the URL to the attention of the authentication process may also be tracked. The date that information in the digital certificate was last changed, as opposed to last authenticated, is also included in an authenticated digital certificate. One preferred embodiment for implementing authenticated digital certificates involves storing the authenticated digital certificates in memory as objects based upon classes defined in an object-oriented design. These objects can contain data structures for a header containing an identifier and geographic location, as well as a set of attributes associated with the authenticated digital certificate for the business.

Other attributes of an authenticated digital certificate include authentication. Authentication is a tiered process, involving both automated and manual processing, therefore a trust level (e.g., "Gold") is stored with the digital certificate along with a date the digital certificate was last authenticated. In one preferred embodiment of the present invention authentication is categorized into an internationally recognizable, four-tiered, stoplight-based color trust/authentication scheme (i.e., Red, Yellow, Green, plus Gold). A red level (stop) indicates a dead link (e.g., the electronic document address no longer points to a valid electronic document). It may also indicate that an authenticated digital certificate could not be issued because of conflicting information found during authentication. A yellow level (caution) indicates an authenticated digital certificate that has recently had recurring access problems, or the spider had detected changes in information, or sites that have been reported as incorrect and not yet verified. A green level (go) is used for newly created authenticated digital certificates that have not be given Gold status yet, all sites that have been automatically authenticated, and are believed to be accurate but have not passed the Gold level of authentication. A gold level (as good as gold) would be limited to authenticated digital certificates where contact had been made with the owner, and the complete set of basic attributes have been completed. Extended attributes are not required, but are desired. The information in a Gold certificate has been verified, and the owner has agreed that as a condition of being Gold, they must complete a monthly, or quarterly, data confirmation form, and notify the authenticated digital certificate authority promptly of any changes in their data. Additionally, sites having authenticated digital certificates are spidered on a regular basis to verify the accuracy of the data.

FIG. 4 illustrates an authenticated digital certificate showing basic attributes in a Virtual classification as configured in an embodiment of the present invention. A virtual classification is an example of a business having a virtual location. In a virtual or Web business, in addition to the geographic location, other attributes including a "zone of service", where the entity or business can conduct commerce, can be defined. In cases of informational Web sites, this would be the entire world, but for many commerce sites, local laws, government restrictions, economic and cultural issues, or personal choice, limit where goods may be sold. In these cases, the zone of service could be defined as the area where the products sold, or services offered, by this virtual business can be legally sold and shipped (if shipping is involved). Virtual businesses may have several zones of service to cover cases of multiple product lines, each with different zones of service.

A hybrid category of business exists where a business in a physical category also operates in a virtual fashion, in which case, they could also have a zones of service in addition to their physical location. Likewise a virtual business could open a physical store, in which case they could be reclassified as a hybrid as well, although their main category would still be virtual. The virtual businesses would be able to indicate the existence of their physical store, while the physical store can promote their Web presence.

FIG. 5 illustrates an authenticated digital certificate showing extended attributes as configured in an embodiment of the present invention. FIG. 5 shows the extended attributes of the authenticated digital certificate of FIG. 3. The extented attributes are exposed by performing a user interface gesture (e.g., clicking) on the extended profile link in the authenticated digital certificate of FIG. 3. Extended attributes often vary depending upon the type of business that is represented by the electronic document, or electronic address (URL). One approach is to classify each electronic document according to the Standard Industry Classification ("SIC") code associated with the business it represents, extended to include new virtual classes of businesses. A template of pertinent attributes can be derived and used as a basis for the extended attributes that are stored in the authenticated digital certificate. FIG. 5 represents an example authenticated digital certificate with extended attributes related to a video sale and rental business. Various particulars, including types of videos available and business policies are available to be searched or viewed by those with access the extended attributes. Extended attributes may not actually be stored within the authenticated digital certificate itself, but may be accessible by way of links to the extended attributes, which can be stored separately (e.g., in an online database).

In addition, in both the search engine, and directory listings cases authenticated digital certificates that are returned can provide extended attributes (information) not found in directory listings. Examples of additional information include: hours of operations, credit cards accepted, return policies, privacy policies, membership in associations such as the Better Business Bureau, American Association of Retired People and the American Automobile Association. Authenticated digital certificates also resolve the problem of the directory listings listing businesses in non-intuitive SIC headings, by searching not only business names, but also business keywords and brand names carried. For example, a user performing a search on "Nike running shoes" using a authenticated digital certificate aware process would receive matches if the stores listed "Nike" as a brand that they carried.

Figure 6:
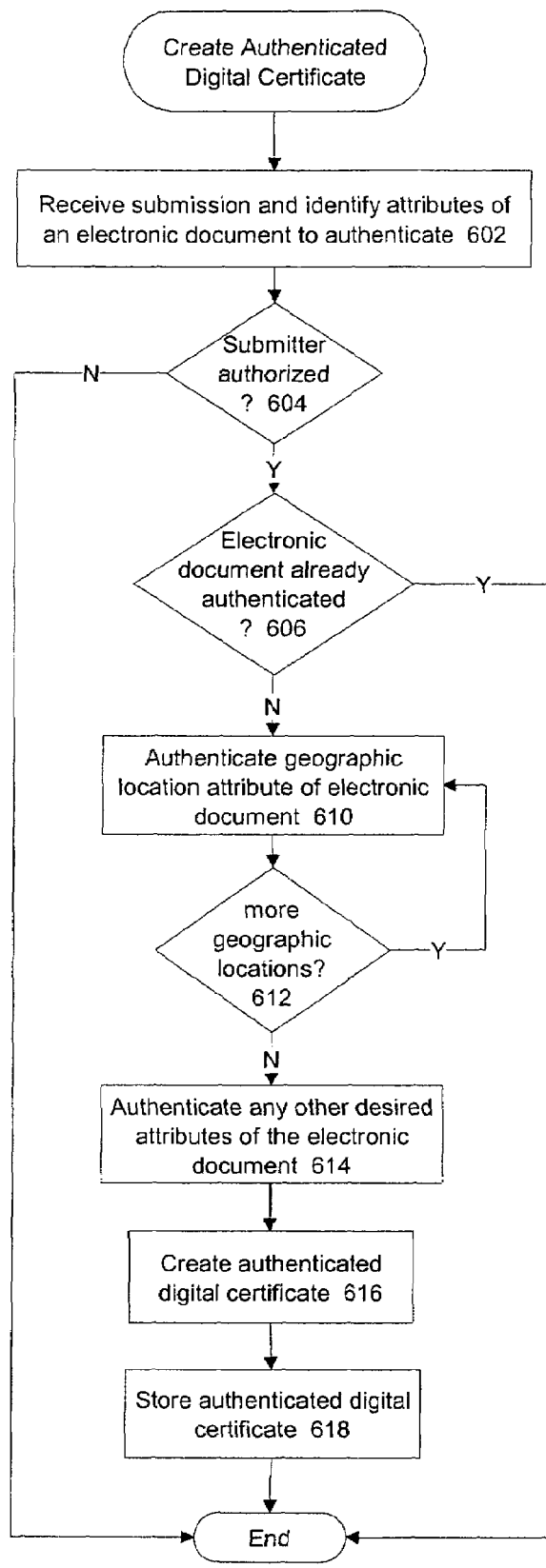
FIG. 6 is a flowchart of an embodiment of the present invention showing a process for creating an authenticated digital certificate.

FIG. 6 is a flowchart of an embodiment of the present invention showing a process for creating an authenticated digital certificate. The creation process starts at step 602 with the submission of an electronic document for the purpose of creating an authenticated digital certificate. Certain attributes (e.g., geographic location) of the electronic document are identified as those for which authentication is to be performed. The submission is typically in the form of a reference to the electronic document, such as an electronic document address (URL). At Step 604 the process checks whether or not the submitter is authorized to submit the electronic document and whether the owner can be correctly verified (see FIG. 6*a*). If the submitter is not authorized the process ends, otherwise a check is made as to whether or not the submitted electronic document is already authenticated (Step 606). If the electronic document is already authenticated (i.e., a record for it exists in an authenticated digital certificate database) then the process ends.

Figure 6A:
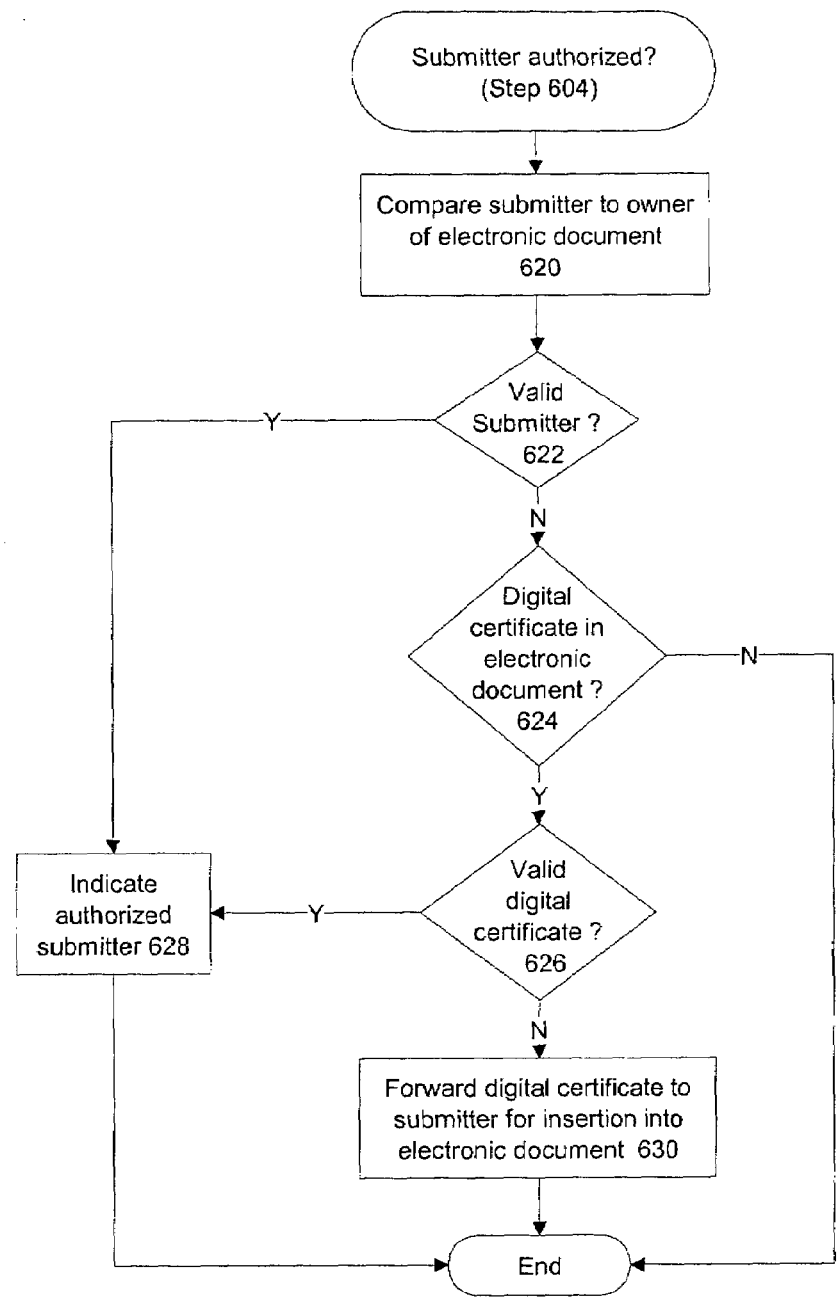
FIG. 6a is a flowchart of an embodiment of the present invention showing a process for authorizing the submission of an authenticated digital certificate.
Figure 6B:
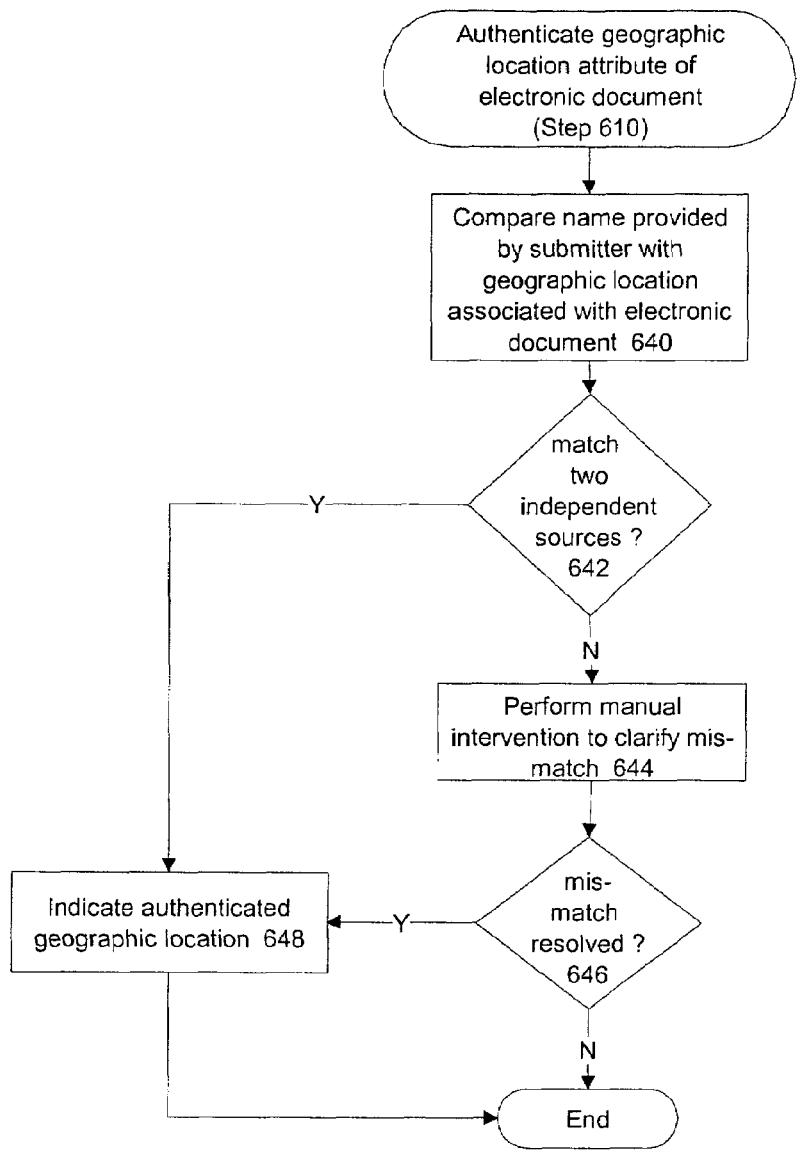
FIG. 6b is a flowchart of an embodiment of the present invention showing a process for authenticating the geographic location associated with an authenticated digital certificate.

If an authenticated digital certificate does not already exist for the referenced electronic document then at Step 610 the geographic location attribute of the electronic document is authenticated (see FIG. 6*b*). If the electronic document is associated with multiple locations (Step 612) then the geographic location verification (Step 610) is performed for each of the multiple geographic locations. When all the geographic locations have been processed Step 614 processes any other desired attributes of the electronic document for authentication according to an appropriate authentication process (e.g., cross-referencing a phone number attribute with current phone listing directory). Partial geographic verification (e.g., where only some of the multiple locations are verified) is possible, but not reflected in flowchart of FIG. 6. The authenticated digital certificate is created at step 616.

The authenticated digital certificate can be stored (Step 618) in a variety of configurations. The authenticated digital certificate is stored as a record in an online authenticated digital certificate database. Attributes of the electronic document can correspond to fields in the database record. Access and security of the authenticated digital certificate can be managed by the database management system managing the database record. The database storage configuration allows for creating authenticated digital certificates without impacting the storage or management of the electronic document itself. Database record storage also allows for creation of authenticated digital certificates for electronic documents without the permission or knowledge of the electronic document owner. In some instances the electronic document is not pre-existing (e.g., the business submitted has no Web page). In this case, an electronic document address is created on-the-fly and stored with the authenticated digital certificate. Later, a matching electronic document may have to be created on-the-fly to satisfy a search or view request.

The authenticated digital certificate can also be stored in a separate file within a directory from which the electronic document is accessed. The directory can be organized as a hierarchical tree structure, the authenticated digital certificate authenticating electronic documents within the directory. The authenticated digital certificate can also be stored in a parent directory within the hierarchical tree structured directory, optionally authenticating electronic documents in the parent directory and child directories. When an authenticated digital certificates exist at various levels within a hierarchical tree structured directory the authenticated digital certificate located closest in the parental lineage to the electronic document (including the directory of the electronic document itself) is used. The authenticated digital certificate file can be secured by various existing methods, including locking and encryption schemes.

Another configuration in which the authenticated digital certificate can be stored is as part of an existing signed and encrypted digital certificate. Technologies currently exist to encrypt and sign electronic documents, the authenticated digital certificate can be stored as an additional component of existing signed digital certificates. Optionally, existing digital signature and encryption technologies can be used to create a stand-alone authenticated digital certificate of the present invention.

In yet another configuration the authenticated digital certificate can be stored as part of the electronic document itself. One example is storing the authenticated digital certificate as an HTML metatag in an HTML Web page. Electronic documents using different page formats provide alternate mechanisms for storing information within an electronic document. A proposal for embedded metatags for geographic locations exists in the form of an Internet Engineering Task Force ("IETF") Internet Draft entitled "Geographic registration of HTML documents" describing a concept of "geotags" (see draft at "http://search.ietf.org/internet-drafts/draft-daviel-html-geo-tag-02.txt"). The geotags described in the IETF Internet Draft contain some of the same information that is stored in the digital certificates of the present invention, but geotags lack a concept of authentication, encoding of attributes or checksum integrity verification.

FIG. 6*a* is a flowchart of an embodiment of the present invention showing a process for authorizing the submission of an authenticated digital certificate. This process for authorizing the submission of an authenticated digital certificate is an expansion of Step 604 described in FIG. 6. The process insures that the submitter is authorized and that the owner is correctly verified.

For primary domain URLs (e.g., a registered domain name) the identity of the submitter is not a factor in the verification of the owner. In this embodiment a primary domain is defined as any domain which is not a sub-domain of another domain (e.g., www.mystore.com). A sub-domain is defined as a domain which is hosted under a primary domain. (e.g., www.mystore.com/fredspizzaplace). In the case of primary domain URLs, online databases (e.g., www.whois.org) list owner information, so the electronic document submitted can be verified, therefore the identity of the submitter does not have to be the owner. Once the ownership is verified a "green level" authenticated digital certificate can be issued for the electronic document, upon further contact with the actual owner a "gold level" authenticated digital certificate may be issued.

For sub-domain URLs (e.g., electronic documents stored below a primary domain URL) verification of ownership is determined based upon the ability to legally access/modify the electronic document submitted. In this case, a digital certificate is generated and electronically mailed to the identified owner of the electronic document. When the digital certificate is subsequently embedded in the electronic document an authenticated digital certificate can be created.

Additional checks on the submitter can be performed to ensure an effective and efficient processing of electronic document submissions. For example, statistics can be maintained to determine if a certain submitter is submitting bogus electronic documents or mechanically generating excessive submissions based on robots or spidering. These checks help prevent fraudulent submissions as well as reduce the chances of spamming the authenticated digital certificate authority site.

At Step 620 the identity of the submitter of an electronic document for authentication is compared to the identity of the owner of that electronic document. If the submitter is validated and the submission is validated (Step 622) then an indication that the submitter is authorized is made at Step 628 and the process ends. If the submitter is not the owner then a check is made for a digital certificate inserted within the electronic document (Step 624). If the submitter matches the name in the digital certificate (Step 626) within the electronic document an assumption is made that the submitter had the authority to access/modify the electronic document to insert the digital certificate and the submitter is indicated as authorized (Step 628). If the submitter does not match the digital certificate within the electronic document then a digital certificate for authorization purposes is produced and forwarded (Step 630) back to the submitter. If the submitter has the authority to access/modify the electronic document, as evidenced by the insertion of the digital certificate into the electronic document, then the electronic document address can be resubmitted. Validation of submitters can include online database searches (e.g., the WHOIS database supplied by Network Solutions®).

FIG. 6*b* is a flowchart of an embodiment of the present invention showing a process for authenticating the geographic location associated with an authenticated digital certificate. This process for authenticating the geographic location is an expansion of Step 610 described in FIG. 6. The process begins at Step 640 where the business/entity name provided by the submitter is compared to the geographic location associated with the electronic document provided (e.g., "Joe's Pizza" and it's electronic document "www.joespizza.com"). If the geographic location of the business matches (Step 642) the locations listed in two independent sources (e.g., the VISA online merchant database and the United States Postal Service street listing database) then an indication of authenticated geographic location is made (Step 648). Otherwise, a manual intervention to clarify the mis-match must be performed at Step 644. If the mis-match is resolved (Step 646) then an indication of authenticated geographic location is made (Step 648), otherwise the process ends with no indication of authenticated geographic location being made.

In one preferred embodiment of the present invention authentication is categorized into an internationally recognizable, four-tiered, stoplight-based color trust/authentication scheme (i.e., Red, Yellow, Green, plus Gold). A red level (stop) indicates a dead link (e.g., the electronic document address does not point to a valid electronic document). It may also indicate that an authenticated digital certificate could not be issued because of conflicting information found during authentication. A yellow level (warning) indicates an authenticated digital certificate that has recently had recurring access problems, or the spider has detected changes in information, or sites that have been reported as incorrect and not yet verified. A green level (go) is used for newly created authenticated digital certificates that have not been given Gold status yet. This includes all sites that have been automatically authenticated, and are believed to be accurate but have not passed the Gold level of authentication. A gold level (as good as gold) is assigned to authenticated digital certificates where contact has been made with the owner, and the complete set of basic attributes have been completed. Extended attributes are not required, but are desired. The information in a Gold certificate has been verified, and the owner has agreed that as a condition of being Gold, they must complete a monthly, or quarterly, data confirmation form, and notify the authenticated digital certificate authority promptly of any changes in their data. Additionally, sites having authenticated digital certificates are spidered on a regular basis to verify the accuracy of the data.

In addition to authentication/trust levels, authenticated digital certificates can be encoded as either representing a virtual Web business or a physical business/entity. Web businesses would have a slightly different authenticated digital certificate, they would be identified as a corporation, or individually run site, and include a corporate headquarters with contact info that can be "withheld upon request" (e.g., for individually run sites that do not want their home addresses listed). The location of the DNS server hosting the site could be displayed as a physical location for Web businesses.

Zones of service are also provided in this preferred environment. Under this arrangement, a single zone of service may be listed, such as US, world, "language=English" or "Canada, US, Mexico". This zone of service refers to where the business' products are suitable to be sold, and can legally be sold or shipped. A business can pick a single state or radius from a location if they feel that their product is not practical for sale into a particular region. For example, a real estate agent does not want to, or may not be allowed to, accept listings outside their town, so a virtual Web site for a real estate agent would have a zone of service of their home town or home state only. Users in another state looking for real estate agents would not see their listings. This arrangement has a lot of practicality for online stores that may be restricted from selling across borders due to various legislation(e.g., ammunition, pornography, alcohol, financial services, as well as a host of other duty-able goods). It is unlikely that an online commerce site would ship goods that required the consumer to hire a customs broker or incur duty costs. However, if a business is selling steel or lumber where products are sold mostly between business to business, then this could be an acceptable practice. The zone of service would be up to the Web site to select with certain guidelines provided by the authenticated digital certificate authority.

Extended attributes for authenticated digital certificates for a virtual business, allow for the creation of a zone of service for a limited number of keywords (e.g., 25 maximum) which could specify different zones of service. These zones of service would be useful for large firms, like Amazon.com, that may ship books to many different countries, but might have to limit encryption-software sales to the US. This allows for multi-tiered results, for example if a user of authenticated digital certificates searches for books in Guelph they would be shown all the local (Guelph) book stores first, but at the bottom, under the heading of virtual sites, they would see the online bookseller Amazon.com. If they were searching for encryption-software, they would see local (Guelph) software dealers, and Canadian virtual software sales sites, but not Amazon.com.

In order not to penalize "brick-and-mortar" businesses that have zones of service far outside their local stores ranges (e.g., Barnes & Noble or Sears), physical businesses that utilize extended attributes can also list zones of service, and an authenticated digital certificate aware browser might not list Barnes & Noble or Sears as a virtual store if they have already listed them as a local store.

The various types of authentications can be related to electronic documents stored in a directory/domain name structure. A type-1 authentication indicates a primary domain where whois.org information matches website and the geographic location and business name are verified from two independent sources. A Green level authenticated digital certificate can be issued in this case, with further follow-up asking to verify and submit any missing information. Type-1 authentications are useful as a tool to "up-sell" existing authenticated digital certificate on extended attribute features.

A type-2 authentication indicates a primary domain where whois.org information does not match business name or geographic location, but business name and geographic location on the site are verified as accurate from two independent sources. A yellow authenticated digital certificate can be issued in this case, with further follow-up including sending email to the WHOIS owner, and site operator requesting verification of data, and submission of missing information. When the owner returns the email, confirming the business data, then a Green authenticated digital certificate can be issued. Alternately, if the site operator inserts an authenticated digital certificate, a Green level can be issued, otherwise a Yellow level can be issued. The various levels can be combined for custom authentication levels (e.g., half-yellow/half green).

A type-3 authentication indicates a sub-domain where geographic location and business name are verifiable and located in the electronic document and spiderable, but as a sub-domain, confirmation of ownership can not be made. In this case an email is sent to URL's contact person, requesting confirmation of information and asking to have them insert an authenticated digital certificate in the electronic document. If they can insert the certificate it is assumed that they the authority to access/modify the electronic document and a Green authentication level can be assigned. There is no need to contact the host of the electronic document, but an email can be sent to the host. If the host confirms the information, a Green authentication level can be assigned to the electronic document. Otherwise, a Yellow authentication level is indicated. If there is no email address, then a fax or automated phone call will be initiated. Only an email sent from the identical electronic document address (URL) will be considered acceptable to submit additional non-verifiable information.

A type-4 authentication indicates a sub-domain submitted by third party that does not have geographic location and business name information within the electronic document (page), and therefore no contact information. A third party has suggested the name and geographic location that can be verified, but not to this page. A Yellow authentication level is initially indicated and email can be sent to a Web host indicating that one of their clients has an unverifiable URL. The Web host could be asked to pass on the request for data to the owner. The owner can then get the authenticated digital certificate authority Web site to get their authenticated digital certificate updated to a Green level and insert the authenticated digital certificate into their page as a metatag. As an incentive, the Web host would automatically receive an online credit towards certain authenticated digital certificate services (e.g., upgrades to extended attribute features) if the electronic document owner in question updates their authenticated digital certificate within a specified time limit.

Figure 7:
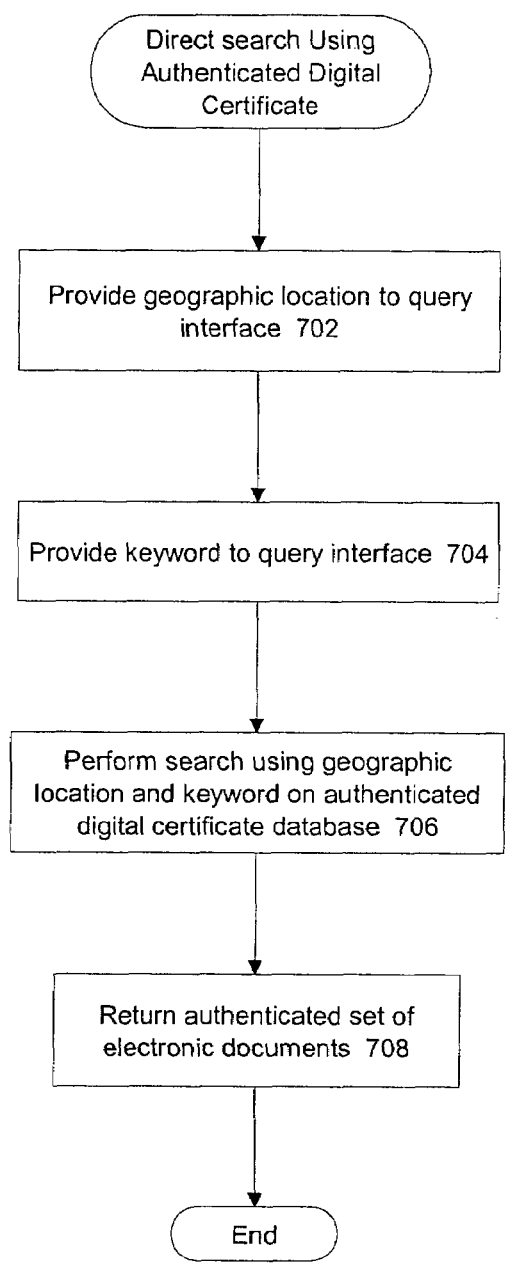
FIG. 7 is a flowchart of an embodiment of the present invention showing a process for direct searching using an authenticated digital certificate.

FIG. 7 is a flowchart of an embodiment of the present invention showing a process for direct searching using an authenticated digital certificate.

The process starts with an authenticated digital certificate aware browser (or other computer application) initiating a search for electronic documents using geographic query criteria provided at Step 702 and keyword criteria provided at Step 704. A search, using the geographic query and keyword criteria is performed on the authenticated digital certificate database (Step 706) and an authenticated set of electronic documents or electronic document addresses is returned at Step 708.

It is possible to search for electronic documents using authenticated digital certificates when the electronic document does not actually preexist. This situation occurs when a business/entity does not yet have a Web site. In this case, an electronic document address is created for the business and stored in the authenticated digital certificate. When searching is performed using the authenticated digital certificate database an authenticated digital certificate having a created electronic document address may be accessed. If this occurs an electronic document is created "on-the-fly", using information stored in the authenticated digital certificate. The newly created electronic document (or the electronic document address) can then be returned to the user.

Figure 8:
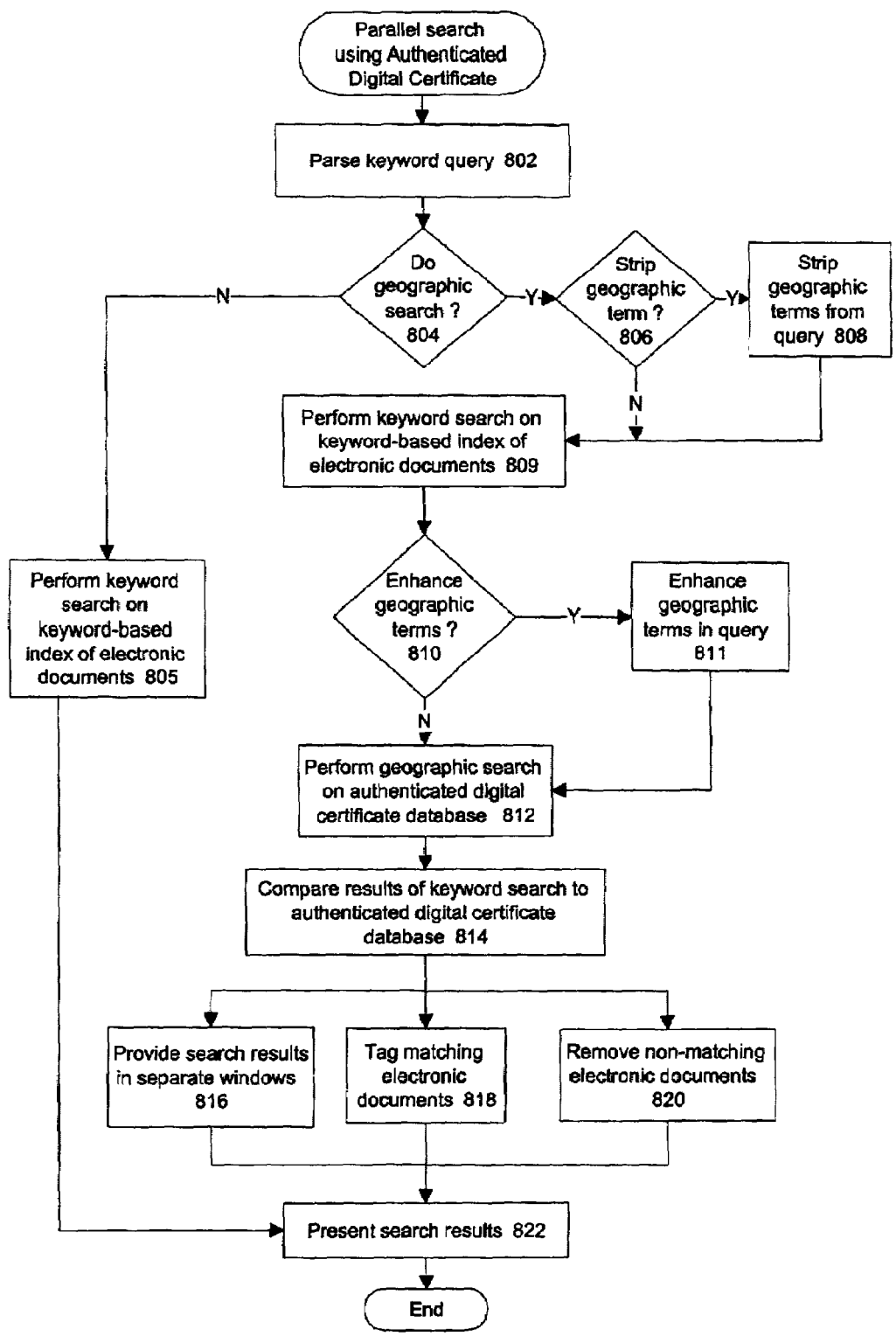
FIG. 8 is a flowchart of an embodiment of the present invention showing a process for parallel searching using an authenticated digital certificate.

FIG. 8 is a flowchart of an embodiment of the present invention showing a process for parallel searching using an authenticated digital certificate. The process begins at Step 802 by parsing a keyword query. A keyword query is a string containing terms, some possibly geographic, some possibly non-geographic, used as criteria in a search. Step 804 checks for geographic terms that may indicate a geographic search should be done. A process run on the keyword query determines if it contains terms that match geographic categories. For example, the parser can detect that terms such as "Boston", "Guelph", "Massachusetts", "Ontario", and "Canada" are geographic terms. If a geographic search is not indicated then a keyword search is performed on the keyword-based index of electronic documents (Step 806) and results of the search are presented at Step 822.

If a geographic search is indicated, a check is made to determine if the geographic terms are to be removed from the keyword query (Step 806). At Step 808 the geographic terms are removed. Whether geographic term are removed or not, a keyword search is performed on the keyword-based index of electronic documents (Step 809).

A geographic search performed on the authenticated digital certificate database conceptually is broken into two parts: a geographic boundary and a non-geographic keyword portion. An option to enhance the geographic boundary can be checked (Step 810), and if set the geographic boundary information can be modified. For example, a keyword query involving "automobiles" and "Boston" can be modified to include geographic locations that are not in Boston proper, but located in "Greater Boston" (e.g., Dorchester, Mattapan and Roxbury). The keyword terms can also be modified to include words associated with the keyword terms prior to the search at step 809 (e.g., "automobile" can be changed to "automobile", "car" or "vehicle"). The extent of the modification may, or may not, be tied to a proximity user preference associated with the user or subject of the query. A geographic search on the authenticated digital certificate database is performed using the possibly modified keyword query at Step 812. Both the term removal/stripping process of Step 808 and the term enhancement process of Step 811 are optional based. These option are based upon user settings and system heuristics. At Step 814 the results of both searches, the keyword-based search and the geographic search are compared. The results of that comparison can provide for displaying each set of results in separate windows (Step 816), tagging matching electronic documents (Step 818) or removing non-matching electronic documents (Step 820). In all cases the results are presented for display in Step 822.

The use of an authenticated digital certificate allows the browser to produce a list of electronic documents that more closely match the keyword-based search results that the user expects. The ability to use authenticated digital certificates in the search process significantly enhances the probability that the resulting electronic documents actually match the search results the user expected.

In a preferred embodiment a database would exist that would contain geographic terms that are often used for non-geographic purposes, including common popular names. Thus phrases such as "Bermuda shorts" would be identified as not referring to the island of Bermuda, other examples include "Boston creme pie", "Black Forest ham", "George Washington" or "Buffalo wings". In these cases a geographic search would not be performed.

The search criteria and authenticated geographic attributes can also interact to automatically derive proximity settings for a geographical search based upon other keywords in the search criteria. When searching for products sold by business an algorithm can be used to match certain products to certain predefined proximity. For example when searching for "pizza" in an authenticated digital certificate aware browser, the algorithm may determine a distance of "3 miles" is acceptable, but if searching is done for "automobiles" a distance of "10 miles" may be used. This allows for the possibility that purchasers will travel different distances for different products. Proximity is not limited to linear distance, proximity can be defined in terms of zip code, driving miles, driving time, as well as other measurements. The algorithm is completely overrideable and has the ability to adjust its parameters (i.e., learn) based upon previous behavior of the user. The user also has the ability to supply user input to adjust any attribute parameters according to their own personal preferences.

Figure 9:
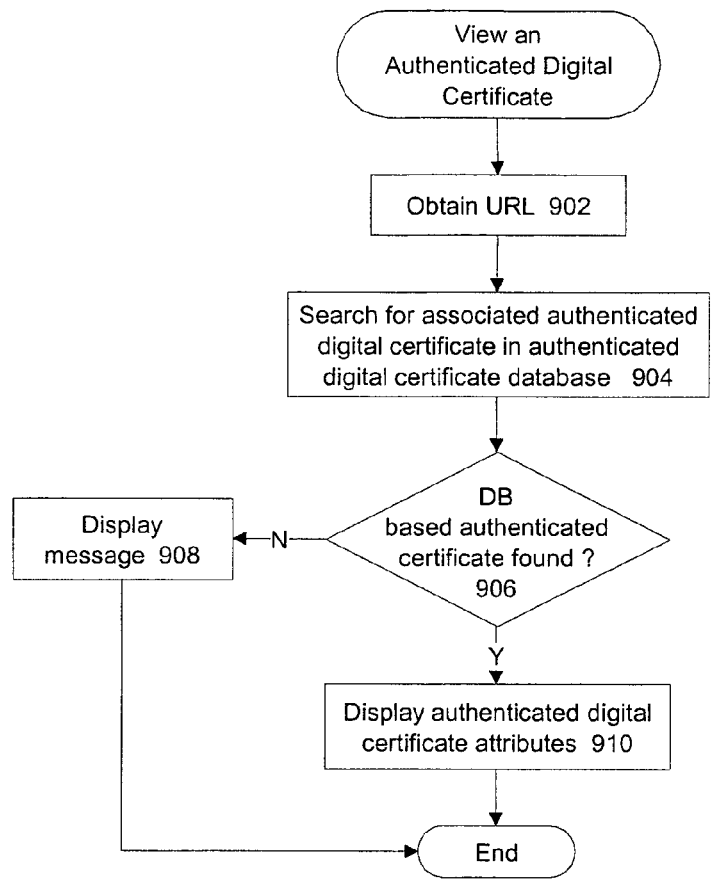
FIG. 9 is a flowchart of an embodiment of the present invention showing a process for viewing an authenticated digital certificate.

FIG. 9 is a flowchart of an embodiment of the present invention showing a process for viewing an authenticated digital certificate. A URL representing an electronic document is obtained at Step 902. The URL is then used to check for an associated authenticated digital certificate (Step 904). Checking involves searching for an authenticated digital certificate stored in the authenticated digital certificate (Step 904). If an authenticated digital certificate is found (Step 906) it is used to display attributes associated with the electronic document at Step 910, otherwise a message is displayed (Step 910). Authenticated digital certificates can be viewed by their owners (e.g., during the creation process) to verify information or by others searching for information about a business entity. The authenticated digital certificate can also be viewed by representatives of the authenticated digital certificate authority in the process of verifying information.

Figure 10:
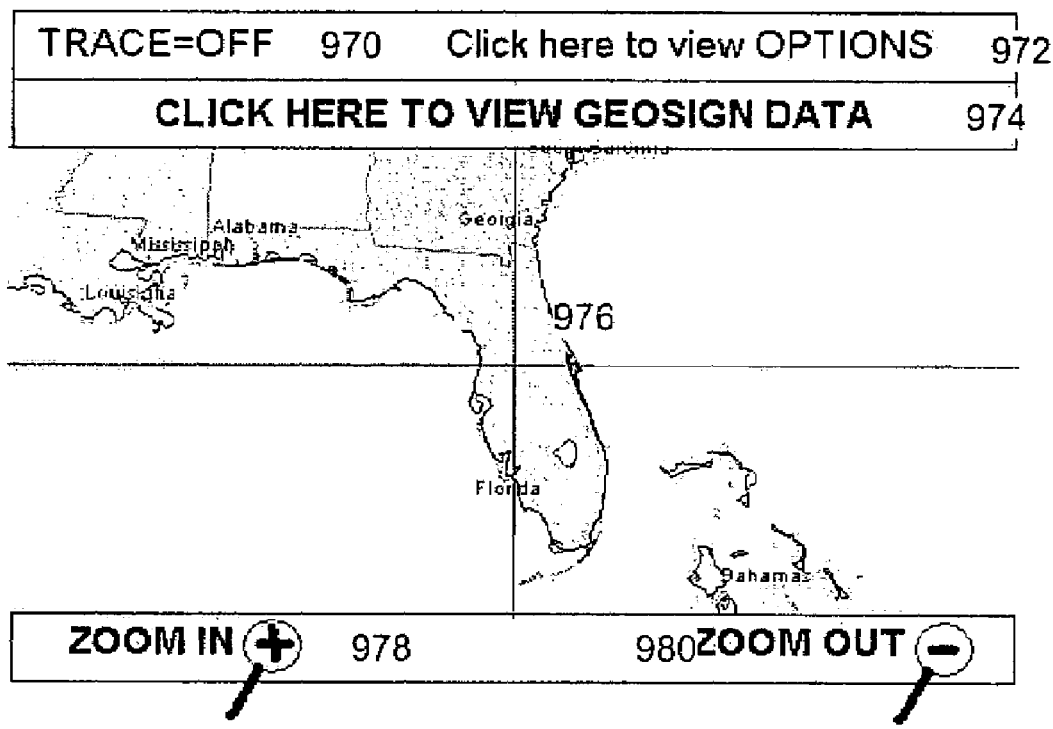
FIG. 10 is an illustration of a map displayed according to an embodiment of the present invention showing an interface for selecting and viewing an authenticated digital certificate.

FIG. 10 is an illustration of a map displayed according to an embodiment of the present invention showing an interface for selecting and viewing an authenticated digital certificate. The map illustrated in FIG. 10 is an example of a pop-up window that can appear when an authenticated digital certificate aware browser sees an authenticated digital certificate metatag or identifies a URL as having an authenticated digital certificate. The map would appear on the screen with cross hairs indicating where the URL was located., for example, near to Orlando, Fla. Other methods for displaying and selecting the URL are also possible, including links, buttons and lists. The user can zoom in or zoom out using zoom in button 978 and zoom out button 980. Tracing (970) is available to show a trace route/path from the user to the business. A button (974) also exists allowing the user to view the authenticated digital certificate data. The user can set a host of other options, which would pull up another screen of choices. These options relating to the view are accessible using the Options button 972.

Figure 11:
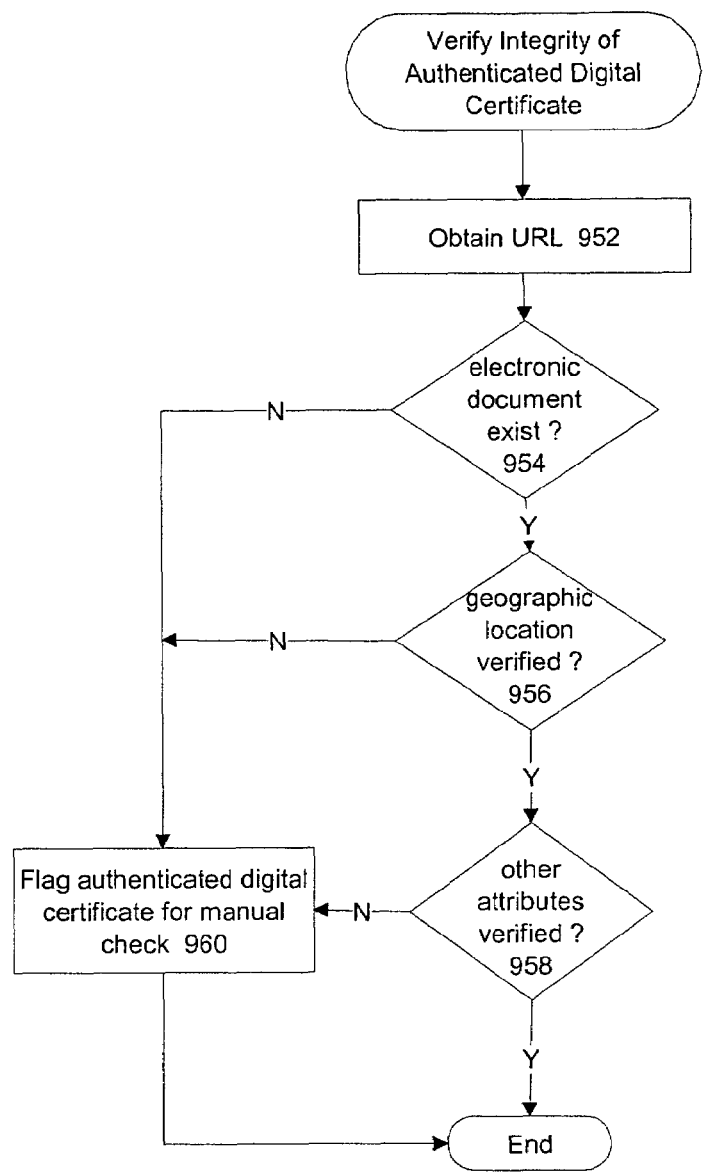
FIG. 11 is a flowchart of an embodiment of the present invention showing a process for verifying the integrity of an authenticated digital certificate.

FIG. 11 is a flowchart of an embodiment of the present invention showing a process for verifying the integrity of an authenticated digital certificate. Authenticated digital certificates, whether stored in a file, a signed digital certificate database or a metatag, always have some representation stored in an authenticated digital certificate database (e.g., on database server 120). Periodically, or upon specific request, the integrity of some or all of the authenticated digital certificates can be checked. The flowchart describes one process by which authenticated digital certificates are verified. The process starts at Step 952 by obtaining the URL from an authenticated digital certificate represented in the database. The URL is checked for existence (i.e., an automated attempt is made to link to it) at Step 954, if the attempt to link to the URL causes an error, a flag is set within the database to perform a manual check for existence (Step 960). Otherwise, the process continues to Step 956 where any geographic location attribute of the authenticated digital certificate is searched for within the electronic document associated with the URL. If the geographic location attribute does not match, a flag is set within the database to perform a manual check of the geographic location (Step 960). Otherwise, other attributes of the authenticated digital certificate are checked (Step 958), again if they do not match a flag is set within the database to perform a manual check of the specific attribute (Step 960). When all attributes have been checked the process ends. Steps 956 and 958 are optional, and can be performed in any order and for any number of attributes.

Example Use of Authenticated Digital Certificates to Locate a Local Business

In a preferred embodiment of the present invention, searching involves the situation where a consumer desires to purchase a product. The customer goes online and researches the product using traditional Internet search tools with no regard to the location of the sites. The initial product research is to determine the desired product information, reviews, prices and other consumer's opinions. The user may visit several sites, chat rooms and discussion forums in this research process. At some point, the user may decide they want to purchase the product, and in many cases will not desire to buy the product online. There are many reasons for not purchasing online, including the desire to have the goods immediately, the need to touch and feel the product especially where size or fit may be concerned, or in cases where the goods are not available for sale online (e.g., legal restrictions on the sale of alcohol or ammunition). At the point the person decides to purchase the product or service, and they have determined not to purchase it online, the immediate need is to locate the nearest location offering the product or service. Currently, the methods to determine location are very poor, they typically involve the person going to a search engine, and typing in the product or service keyword, a geographical keyword representing their town, and scanning through a large number of listings that may be in the hundreds or thousands. The listings are often no where near the geographic location of the user, despite the search engine matching the words. Alternatively, online yellow page directories are consulted which contain a far more geographically concise list but often lack any URL listings to the business, and are often outdated in terms of geographic location. The business' Web site represents the best place to see what products and services are available at a given store. Without the ability to link to the business Web site, the user may physically visit a site and find out they do not carry the product mentioned, or have moved locations. Directory listings also have an inherent weakness in that they are sorted by SIC codes, so often services and locations are not intuitive and therefore missed.

An example business is a running shoe store which you would expect to find under either "Shoes-retail" or "Shoe stores". In fact, the correct SIC category is "sportswear—retail". Often the consumer has no idea that this is the case, so a search on "running shoes" will either show no matches, or shoe stores, of which none or few carry running shoes. This presents a false representation of the local economy and therefore undermines the effectiveness of directory listings.

The user therefore is currently stuck with the choice of checking out a large number of possibly irrelevant URLs to find which web sites or using a directory that may not list URLs. When using a directory listing service the user is typically presented with a list of phone numbers, and must call around to find out what the Web sites URLs are, whether they have the product and if their address (geographic location) is still current.

A preferred embodiment of the present invention helps both the overly large search list and the sparse directory listing situations. In the case of the search engine, a process using authenticated digital certificates would parse the keyword entry and locate the geographical keyword, and perform a parallel search using the authenticated digital certificate database, but returning only matches that are physically located within the geographical area specified. In addition, the authenticated digital certificate would be used to indicate which URLs returned by the search engine are found in the authenticated digital certificate database, and if so, where they are geographically located, so the user has an immediate method of focusing their search on the correct URLs. Alternatively, they can consult the parallel search results that are all located in the geographical region. In the directory listing, a similar action takes place. When a browser plug-in detects a geographic term in a query, a parallel search is returned. Some interactions with directory listings not be possible, due to selection coming from pull down menus preventing parsing efforts. When the user is provided with a list of geographic locations, they can simply highlight the table, or text listings, and the browser plug-in will perform a match with the authenticated digital certificate database, confirming the URLs of all the geographic locations that have web sites, thus confirming or correcting the geographic locations.

Authenticated digital certificates enhance searching for businesses by providing accurate location filtering of search results, verification of information, increased depth of information, and URL addresses, where none were provided. This allows the consumer to locate a local business much more quickly, connect to their Web site and see if the product they want is available and at what price.

Example Use of Authenticated Digital Certificates to Create Local Portals

A very common task, especially for travelers is to research a foreign city or town before they visit it to see what restaurants, hotels, activities etc. are available. Each user has particular interests. Using a search engine presents many problems mostly involving returns of large number of results that are tedious to sift through especially since the sites are not ordered by geographic locations of the entries portrayed on the Web sites. Therefore, a user can spend hours and hours reviewing Web sites that are not relevant to that particular region. While "city pages" provide a general overview of the city, they are not available for many regions, and lack the ability to search the businesses web sites provided on their city page, and often do not have the URLs of these businesses, so the user cannot connect to those sites.

Ideally, the user would want a local portal such as a Yahoo!, or Altavista that contains only entries for a particular region of geography. Yahoo! offers local sites on a country by country basis, and has local city sites, but these are human generated, and cannot be searched using keywords. For example, when a user searches for "restaurants" in the Yahoo! San Francisco search window, twenty different sub-regions of restaurants appear and then a choice has to be made within in each of these for different types of food, such as Chinese, Japanese, cafes, European, Internet cafes etc. The actual search results report the entire web. A search for "Chinese restaurants MSG" or any other phrase that does not exactly match a predefined category provides no matches. Yahoo! and other search engines cannot provide true localized portals since they have no way of connecting the URLs from a search result with their geographic locations.

Using authenticated digital certificates, a localized portal can be created, as authenticated digital certificates provide the critical URL to geographic location link. Depending on the size of the region, two options are available in a preferred embodiment of the present invention. For a small region, when bandwidth is available, a localized index approach is used. For larger regions, a filtered approach using large existing search engines is used. A region can be defined in a large number of ways, including a radius out from a central point, a city, state or postal code as a filter, a driving distance from a central point, or even one or more bounded regions drawn on a map. Once the region is selected, a list of all URLs in that region is extracted from the authenticated digital certificate database and stored in a local portal database table.

In the case of portals for a small region, or a large region which will be topical for a long period of time, such as a local community, a spider would connect to the associated URLs and download the entire Web site and index onto a local machine. As storage space and bandwidth could be a factor, the user could request no graphics, audio or video be downloaded. Alternatively, the user can request a Web site's main URL only, or a specific depth of pages (e.g., only download two pages deep) to reduce resources required. As the pages are downloaded, they are stored in a compressed format, and indexed. If storage space is an issue, the original Web sites need not be stored as long as they are indexed. If storage space is not an issue, the pages are stored locally along with the index. Additionally, dynamic content may also be stored. At the end of the process, the user has a snapshot of the Internet, bounded by the specified regions. This snapshot can be stored on a DVD or CD and used in an offline device or sold as a snapshot of the Internet. Alternative implementations allow subsetting based upon particular categories of information, such as businesses, or schools.

The user would have the choice of several front end interfaces to view snapshot data. One is a Yahoo! type portal/search engine interface. Another interface is a directory service interface, and yet another is a map with URLs displayed. In all cases, the user could perform searches as in a traditional search engine, yet the results would be limited to the Web sites contained in the region.

In a preferred embodiment of the present invention this service includes a set of CDs, DVDs or other mass storage devices created for popular tourist regions by category. A tourist could buy a DVD with all the restaurants and hotels in Las Vegas on one DVD, and all the casinos on another.

The user is provided with a viewer to read these devices, as an alternative if a computer or similar device is not available. With Internet access, the program is able to update the snapshot of URLs if data has changed, allowing dynamic content to be accessed. Access time for these mass storage devices is almost immediate, since all the information is stored locally. Since these CDs, DVDs and mass storage devices can be erased and re-used, custom devices can be made with little lead time to meet unique demands. A single DVD can store 16 Gb of data, holding about 160,000 Web pages (based on a 100K average Web page size). Likely, the index may be 10 Gb, and the number of Web pages is reduced to 60,000, or less if additional graphics/audio/video is allowed, but still substantial and useful.

For larger regions, a preferred embodiment of the present invention is used to create a local portal using authenticated digital certificates. The processes is similar in that a user specifies a region (e.g., city, distance from a central point, shape drawn on a map, driving distance) and boundaries represented by the user's inputs are calculated. A set of URLs is developed as a query against the authenticated digital certificate database. These URLs would be stored in a master table locally on the user's computer. When the user connects to the Internet, a browser plug-in reads all the URLs requested, if the URL was not in the table it can prevent the URL from loading, or provide a warning to the user that they are leaving the local region and connecting to the Internet outside the region. Note that certain Web sites, such as Yahoo!, that might be located outside the defined region, could be added to an exclusion list, so that a user's popular Web sites are still accessible. Whenever URLs are displayed as either links or results from a search engine, the local links appear with some form of identifying ornamentation (e.g., color, highlight, double underline, italic, graphic insertion). Alternatively, search results can be stripped of all matches that are not local, so that they do not even appear. As technology storage devices increase, and bandwidth becomes less of an issue, the local storage implementation will probably become more desirable.

Example Use of Authenticated Digital Certificates in a Wireless Environment

Currently, there exist several solutions for providing locations of nearby businesses/entities based on locating a wireless device using various technologies, and then supplying names, addresses and phone numbers of local businesses to the wireless device. This benefits users not familiar with an area by allowing them to find places of interest including cash machines, restaurants, hotels etc. Many Web sites may store information about a user (e.g., cookies) so that a specific user's request for the nearest, restaurant or hotel, is enhanced by knowing the user's preferences (e.g., non-smoking, Chinese food). The current method has several problems. First, if the user requests restaurants within a certain radius, a very large number of choices may be provided, but an option to display less than all the restaurants may result in preferred restaurants not being displayed. When all restaurants are displayed, the user must spend considerable time scanning through all the listings. Ideally, the profile of the user's personal interests would be used to filter the results. For example, if the user is allergic to raw fish, then sushi restaurants would not be displayed. Descriptive information is already stored by some vendors, however the usefulness of profile data is only valid if the Web site of the restaurant matches the categories stored in the user profile. For example, if one of the user profile categories is "handicapped access", then the obvious result is only to display restaurants that have handicapped access. However, if the only descriptive information known is address and phone number, then it is impossible to determine whether the establishment has handicapped access or not. While some industries, such as restaurants, are listed by services that include additional information (e.g., AAA or Fodor's), the problem still exists that there is a different collection of data for every industry, with various levels of detail. Some industries have little additional data available. At other times this data is expensive to license, and often the data is prejudiced by membership requirements, or inaccuracy due to a lack of updates. Authenticated digital certificates are designed to provide a common format for basic and extended attribute information common to most businesses. Attribute information could include, name, address, latitude, and longitude (for location services), phone number, fax number, hours of operation, terms and methods of payment, language of service, return policy, and most importantly the URL and Wireless Application Protocol ("WAP") URL for the business. Authenticated digital certificates provide an extended template, that while different for every industry, has a common interface and file structure. These two types of authenticated digital certificates (basic and extended) provide a common format that can be read by any developer who wants to access business information. Additional levels of information can be supplied using authenticated digital certificates of different formats, providing either more or less information than supplied by the basic and extended type authenticated digital certificates. This also allows applications to be developed that can filter information by matching the personal profiles with business profiles using a much greater depth of information, and therefore providing a much more accurate searching/filtering experience. Even without providing additional sources of data, the availability of a single format for existing data is an improvement over present methods. Also, since authenticated digital certificates are authenticated and maintained by various methods, including changes to the user's Web site, providing a new level of accuracy that decreases false positive matches. Note that the personal profile could be stored in an authenticated digital certificate aware browser plug-in, or could be a third party's own profile format.

Once the ability to accurately filter information has been provided to the user, the process of contacting the businesses can commence. It is impossible to store all the information about a business or place of interest in a single authenticated digital certificate. There will be questions that the user has that require additional information and may require a contact. For example, in the case of a restaurant, the user needs to know whether seating is available at a certain time, whether they have a kids menu, whether they are located near a bus stop, or whether they use MSG in their food. Other examples include hotels. The user may want to know if they have a workout facility, if the pool is open this time of year, whether they have foam pillows, or if they have dataports in any of the rooms. Regardless of whether this information is provided in the authenticated digital certificate or not, the user may also want to confirm the information. The two options involve calling the business, which can involve long distance charges, be time consuming, require the business to be open, having a non-busy line, having someone to answer the phone who knows the answers, or having an automated attendant with options to answer the user's questions. Alternatively, the more functional option is to connect to the business' Web site. The Web site is accessible at no charge, at any time of day, usually contains far more detailed information than is in yellow pages or even an authenticated digital certificate and therefore is a good place to start any research. As Web sites evolve the requirement to still contact the business by phone will become less and less, especially as expert systems collect queries and archive them so that the Web sites become more and more useful over time.

The ability to connect to a Web site is a requirement predicated on having a device that can access the Internet, which wireless devices either have directly, or can access through their a carrier. However, a second requirement is that the URL of the business must be known. This is a huge problem right now, as current locator services often have no URL information, and if they do it is sporadically available, and thus cannot be relied upon. Currently, when a URL is provided, there is no knowledge of whether the link is dead or not, or whether the link is correct. The lack of an infrastructure tool that provides a connection between the ground (geographic location) and URLs prevents the ability to consistently offer a powerful service—that being the ability to allow a user to locate the closest businesses, based on their personal profile, and connect to the most accurate source of information about those businesses (i.e., the businesses' own Web sites). Authenticated digital certificates provide the infrastructure to accomplish this. Authenticated digital certificates provide the URL to ground link, and additionally allow for continually monitoring these links to look for changes in information, and to ensure the URLs still exist so that at any given time, the authenticated digital certificates database is the most accurate source for current basic detailed information about local businesses and other places of interest.

A further use of authenticated digital certificates represents an improvement over the basic use of authenticated digital certificates in a wireless environment by enabling a wireless device to connect directly to a Web site and negotiate a transaction with that Web site. The user of a wireless device can have a personal profile. This profile can be stored as a "personal authenticated digital certificate", without providing the identity of the user, if privacy is a concern. In order to be most useful, a wireless device should minimize the user's involvement in non-decision based tasks, and maximize the productivity of the device itself. One embodiment that meets these criteria is having the wireless device receive a request from the user in the form of voice, keyboard, or other input. For example, the user may activate the device, and say, "Find me dinner for four people at 7:00 pm.". This request triggers the device to load the user's profile, and to connect to the authenticated digital certificate database where it immediately has access to the authenticated digital certificates for all the local businesses that meet the criteria of the request (i.e., restaurants), within a set bounded range (i.e, within five miles) and matches these against the personal profile using a ranking system that is a combination of excluding and influencing factors that combine to create a percentile. Distance is be a major influencing factor. From this set of matches, a cut-off is used to include only relevant matches, or if there are many matches only those within a predefined cutoff are identified. A process using the personal authenticated digital certificate then contacts the Web site's authenticated digital certificates and may open up a secure communication (e.g., SSL). Because the device knows where it is located, and knows that authenticated digital certificates are authenticated to a geographic location, a level of trust with respect to distance is established. The authenticated digital certificates can also be encrypted to insure that it contains information that the user can trust. Once the communication is opened, the device requests a reservation for the four people at 7:00, and provides its personal authenticated digital certificate number that the business authenticated digital certificate process can identify as legitimate. The business authenticated digital certificate process can accept or reject the request automatically, or generate a request to a device belonging to the business owner. The business owner can then approve the request. Once an approval or non approval is issued, the user's device collects this information, and after repeating this procedure with all the identified matches, provides the owner with the choices. The owner can then see a number of openings, each being held for a period of time set by the business owner's website. The owner can then make a decision by picking one of the choices. The device can confirm the choice and optionally release credit card information to hold the reservation, as well as canceling the other choices. In addition to these benefits provided to users, authenticated digital certificates provide benefits to businesses as well. Being able to authenticate a user allows a business to modify business behavior, thus allowing the business to block users who might abuse the business service or restrict transaction from certain authenticated users.

Authenticated digital certificates provide a trusted mechanism for commerce to take place. Without authenticated digital certificates, there is a potential for businesses to identify themselves incorrectly to increase matches and thus commerce. Additionally, without a common protocol, each device would have to have hundreds of different negotiation programs (e.g., one for hotels, one for restaurants, one for dry cleaners, one for video stores etc.), with authenticated digital certificates, there is a common mechanism for securely initiating a transaction which can be interfaced with any back-end system being used by the businesses with little effort.

While this invention has been particularly shown and described with references to preferred embodiments thereof, it will be understood by those skilled in the art that various changes in form and details may be made therein without departing from the scope of the invention encompassed by the appended claims. Particularly, a person of ordinary skill in the art will recognize that referring to an electronic document, electronic document address and a URL can sometimes be done synonymously. The use of these terms is in no way intended to limit the invention to a particular implementation and one of ordinary skill in the art will be able to distinguish among them based upon context.

An embodiment of the present invention allows users to view and search on authenticated attributes that are related to specific membership organizations. For example the Automobile Association of America ("AAA") seal on a business is used by many travelers to access the quality of an establishment. Being able to display the AAA logo, using an authenticated digital certificate, allows viewers and searchers of electronic documents (e.g., Web pages) the ability to quickly determine which businesses they might purchase from. Access to the AAA extended attribute might come from a UserId and password issued from the organization when a membership subscription is purchased.

In yet another embodiment of the present invention the authenticated digital certificates are used for searching and viewing geographically authenticated electronic documents associated with non-business entities. For example government, non-profit, educational organizations would benefit from using authenticated digital certificates. Additionally, individuals can also have authenticated digital certificates created and used for searching and viewing. One benefit of individual, or personal, authenticated digital certificates is that they can be used to provide privacy to individuals while still supplying search process accurate geographic location data for searching. Based upon a user's geographic location a proximity search can access the user's geographic location, but prevent a viewer from accessing the underlying geographic location. When displayed, or mapped, the geographic location can be shown to be within a certain region without revealing the user's exact location.

What is claimed is:

1. A computer implemented method of improved searching for electronic documents on a computer network comprising the steps of:
    creating a collection of URL addresses of electronic documents that are associated with businesses having a geographic location being authenticated by a mechanism other than by the content of the electronic document;
    receiving a geographically based query specifying a desired geographic location and a keyword at a query interface;
    searching a searchable index of content to identify electronic documents having URL addresses that match the desired geographic location and the keyword;
    searching the collection of geographically authenticated URL addresses to identify URL addresses of electronic documents that match the desired geographic location;
    comparing the search results from the searchable index with the search results from the collection of geographically authenticated URL addresses to identify an authenticated set of URL addresses of the electronic documents which match the desired geographic location and the specified keyword;
    returning the authenticated set of URL addresses of the electronic documents which match the desired geographic location and the specified keyword; and
    wherein creating a collection URL addresses of electronic documents that are associated with businesses having a geographic location being authenticated by a mechanism other than by the content of the electronic document further includes:
        storing, in a table locally on a user computer, the URL addresses that are associated with businesses having a geographic location corresponding to the desired geographic location;
        using a web-browser plug-in detecting a requested URL address in search results from a search engine;
        checking whether the requested URL address is stored in the table to verify that the requested URL address is associated with the desired geographic location; and
        providing a user warning if the requested URL address is not associated with the desired geographic location.

2. The computer implemented method of claim 1 wherein the query interface is implemented as a Web browser plug-in.

3. The computer implemented method of claim 1 wherein the step of searching is triggered by the desired geographic location provided to the query interface.

4. The computer implemented method of claim 1 wherein the searching step further comprises limiting the authenticated set of URL addresses to those within a predefined proximity of the desired geographic location.

5. The computer implemented method of claim 4 wherein the predefined proximity is automatically generated based upon the keyword.

6. The computer implemented method of claim 4 wherein the predefined proximity is automatically adjusted based upon the authenticated set of URL addresses provided.

7. The computer implemented method of claim 1 further includes creating the searchable index using text from the electronic documents of the geographically authenticated URL addresses by:
    spidering from a user computer, the electronic documents associated with the geographically authenticated URL addresses to create the searchable index; and
    storing, locally on the user computer, the searchable index.

8. The computer implemented method of claim 7 wherein spidering, from a user computer, the electronic documents associated with the geographically authenticated URL addresses to create the searchable index further includes
    receiving a request to limit the spidering of one or more of the electronic documents to a specific depth in order to reduce resources on the user computer, and
    storing the searchable index resulting from the spidering in a compressed format locally on the user computer.

9. The computer implemented method of claim 8 wherein receiving a request to limit the spidering of one or more of the electronic documents to a specific depth in order to reduce resources on the user computer further includes specifying one more of the following:
    limiting spidering of the electronic documents to a specific page depth; or
    preventing graphics, audio and video associated with the spidered electronic documents from being stored locally on the user computer.

10. The computer implemented method of claim 7 wherein spidering, from a user computer, the electronic documents associated with the geographically authenticated URL addresses to create the searchable index further includes:
    determining whether any of the electronic documents associated with the geographically authenticated URL addresses contain updated content; and
    spidering, from the user computer, the updated content to update the searchable index.

11. The computer implemented method of claim 1 wherein providing a user warning if the requested URL address is not associated with desired geographic location further includes alerting the user using a visual notification on the user interface of the web browser.

12. The computer implemented method of claim 1 wherein providing a user warning if the requested URL address is not associated with desired geographic location further includes preventing a web browser, using a plug-in, from accessing the requested URL.

13. The computer implemented method of claim 1 wherein creating a collection URL addresses of electronic documents that are associated with businesses having a geographic location being authenticated by a mechanism other than by the content of the electronic document further includes authenticating the geographical location using an independent source that is at least on of credit card online merchant database; United States Postal Service street listing database; or an electronic Yellow Pages directory.

14. A computer implemented method of improved searching for electronic documents, the method comprising:
    creating a collection of geographically verified URL addresses of electronic documents that are associated with businesses located in one or more geographic locations being verified by a mechanism other than the content of the electronic document;

receiving a set of URL addresses from a search engine, where the set of URL addresses are provided by the search engine as search results in response to a user query specifying a desired geographic location and a keyword; and searching the stored geographically verified URL addresses to identify URL addresses associated with the desired geographic location;

comparing the set of URL addresses provided by the search engine with the identified geographically verified URL addresses to identify matches, providing the URL addresses in the search results from the search engine which match the identified geographically verified URL addresses; and storing geographically verified URL addresses of electronic documents that are associated with business located in one or more geographic locations including:

storing, in a table locally on a user computer the URL addresses that are associated with businesses having a geographic location corresponding to the desired geographic location;

using a web-browser plug-in detecting a requested URL address in the search results from the search engine;

checking whether the requested URL address is stored in the table to verify that the requested URL address is associated with the desired geographic location; and providing a user warning if the requested URL address is not associated with the desired geographic location.

15. A computer implemented method according to claim 14 wherein the set of URL addresses is received at a geographic location filter of a search engine query interface.

16. A computer implemented method according to claim 14 wherein the desired geographic location and the keyword are search criteria used by the search engine to produce the search results.

17. A computer implemented method according to claim 14 wherein the collection of geographically verified URLs is stored in a database that associates the URL addresses with a respective geographic location, the geographic location being authenticated by a mechanism other than by the content of the electronic document.

18. The computer implemented method of claim 14 wherein providing a user warning if the requested URL address is not associated with desired geographic location further includes alerting the user using a visual notification on the user interface of the web browser.

19. A computer implemented method according to claim 14 wherein providing a user warning if the requested URL address is not associated with desired geographic location further includes preventing a web browser, using a plug-in, from accessing the requested URL.

20. A computer implemented method according to claim 14 wherein creating a collection of geographically verified URL addresses of electronic documents that are associated with businesses located in one or more geographic locations being verified by a mechanism other than the content of the electronic document further includes authenticating the geographic location using an independent source that is at least one of credit card online merchant database; United States Postal Service street listing database; or Yellow Pages directory.

21. A computer implemented method according to claim 14 wherein providing the matching URL addresses further includes identifying the matching URL addresses in the search results on the user interface with ornamentation using at least one of the following: a particular color, highlighting, double underlining, italicizing, or graphic insertion.

* * * * *

UNITED STATES PATENT AND TRADEMARK OFFICE
CERTIFICATE OF CORRECTION

PATENT NO. : 7,233,942 B2  
APPLICATION NO. : 10/620170  
DATED : June 19, 2007  
INVENTOR(S) : Timothy G. Nye Page 1 of 1

It is certified that error appears in the above-identified patent and that said Letters Patent is hereby corrected as shown below:

Claim 8  
In Column 26, line 16, after "includes" insert -- : --.

Claim 13  
In Column 26, line 58, delete "on of" and insert -- one of: --.

Claim 14  
In Column 27, line 18, after "computer" insert -- , --.

Claim 14  
In Column 27, line 22, after "plug-in" insert -- , --.

Claim 14  
In Column 28, line 27, after "of" insert -- : --.

Signed and Sealed this

Twenty-fifth Day of September, 2007

JON W. DUDAS  
*Director of the United States Patent and Trademark Office*